(12) United States Patent
Lee et al.

(10) Patent No.: US 12,359,835 B2
(45) Date of Patent: Jul. 15, 2025

(54) VENTILATION APPARATUS AND CONTROL METHOD THEREOF

(71) Applicant: SAMSUNG ELECTRONICS CO., LTD., Suwon-si (KR)

(72) Inventors: Donggyu Lee, Suwon-si (KR); Jaehyoung Sim, Suwon-si (KR); Kyunghoon Kim, Suwon-si (KR); Sunggoo Kim, Suwon-si (KR); Hyeongjoon Seo, Suwon-si (KR); Eomji Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 17/945,661

(22) Filed: Sep. 15, 2022

(65) Prior Publication Data

US 2023/0160597 A1    May 25, 2023

Related U.S. Application Data

(63) Continuation of application No. PCT/KR2022/013024, filed on Aug. 31, 2022.

(30) Foreign Application Priority Data

Nov. 19, 2021    (KR) .................. 10-2021-0160695

(51) Int. Cl.
*F24F 11/77*    (2018.01)
*F24F 11/65*    (2018.01)
(Continued)

(52) U.S. Cl.
CPC .............. *F24F 11/77* (2018.01); *F24F 11/65* (2018.01); *F24F 11/81* (2018.01); *F24F 12/00* (2013.01);
(Continued)

(58) Field of Classification Search
CPC .. F24F 11/77; F24F 11/65; F24F 11/81; F24F 12/00; F24F 12/006; F24F 13/10;
(Continued)

(56) References Cited

U.S. PATENT DOCUMENTS 5,572,799 A * 11/1996 Masuyuki ............. F24F 3/1423
                                                    34/80
5,752,323 A *  5/1998 Hashimoto ........... F26B 21/083
                                                    34/80
(Continued)

FOREIGN PATENT DOCUMENTS

CN         107152744        5/2020
EP         4343221 A1 *     3/2024 .............. F24F 11/65
(Continued)

OTHER PUBLICATIONS

PCT/ISA/237 dated Jan. 4, 2023 in International Patent Application No. PCT/KR2022/013024 (4 pages).
(Continued)

*Primary Examiner* — Ljiljana V. Ciric
(74) *Attorney, Agent, or Firm* — STAAS & HALSEY LLP

(57) ABSTRACT

A ventilation apparatus includes: a housing including a first inlet through which outside air is sucked, a second inlet through which room air is sucked, a first outlet through which air is supplied to an indoor space, and a second outlet through which air is discharged to an outdoor space; an outside temperature sensor configured to measure a first temperature of the outside air; a room temperature sensor configured to measure a second temperature of the room air; a total heat exchanger configured to perform heat exchange between the outside air and the room air; a first blower communicating with the first outlet; a second blower communicating with the second outlet; and a processor to perform a drying operation for the total heat exchanger by (Continued)

operating at least one of the first blower or the second blower, based on a difference value between the first temperature and the second temperature.

15 Claims, 17 Drawing Sheets

(51) Int. Cl.
  *F24F 11/81* (2018.01)
  *F24F 12/00* (2006.01)
  *F24F 13/10* (2006.01)
  *F24F 13/20* (2006.01)
  *F24F 13/22* (2006.01)
  *F24F 110/10* (2018.01)
  *F24F 110/12* (2018.01)
  *F24F 120/10* (2018.01)

(52) U.S. Cl.
  CPC ............ *F24F 12/006* (2013.01); *F24F 13/10* (2013.01); *F24F 13/20* (2013.01); *F24F 2013/225* (2013.01); *F24F 2110/10* (2018.01); *F24F 2110/12* (2018.01); *F24F 2120/10* (2018.01); *Y02B 30/56* (2013.01)

(58) Field of Classification Search
  CPC .. F24F 13/20; F24F 2013/225; F24F 2110/10; F24F 2110/12; F24F 2120/10; F24F 2013/205; F24F 2221/22; Y02B 30/56
  See application file for complete search history.

(56) References Cited

U.S. PATENT DOCUMENTS

| | | | |
|---|---|---|---|
| 10,495,341 B2 * | 12/2019 | Hashino | F24F 11/77 |
| 10,928,093 B2 * | 2/2021 | Okeya | F24F 6/00 |
| 11,181,285 B2 * | 11/2021 | Hamada | F24F 11/0001 |
| 11,473,795 B2 * | 10/2022 | Han | F24F 12/006 |
| 2019/0128556 A1 * | 5/2019 | Grinbergs | F24F 11/41 |
| 2020/0326086 A1 * | 10/2020 | Hamada | F24F 11/81 |
| 2022/0178575 A1 * | 6/2022 | Lee | F25B 13/00 |
| 2022/0178597 A1 * | 6/2022 | Sim | F24F 11/84 |
| 2022/0186994 A1 * | 6/2022 | Ha | F25B 13/00 |
| 2022/0404059 A1 * | 12/2022 | Hwang | F24F 11/63 |
| 2023/0160597 A1 * | 5/2023 | Lee | F24F 13/20 165/291 |
| 2023/0213227 A1 * | 7/2023 | Lee | F24F 13/20 62/81 |
| 2024/0133577 A1 * | 4/2024 | Yasuda | F24F 11/65 |
| 2024/0167710 A1 * | 5/2024 | Lee | F24F 11/42 |
| 2024/0210056 A1 * | 6/2024 | Sotokawa | F24F 11/74 |

FOREIGN PATENT DOCUMENTS

| | | | | |
|---|---|---|---|---|
| JP | 2008-151458 | | 7/2008 | |
| JP | 2017-44424 | | 3/2017 | |
| JP | 2022-136770 | | 9/2022 | |
| JP | 7380849 | | 11/2023 | |
| KR | 10-1560192 | | 10/2015 | |
| KR | 102059727 B1 * | 12/2019 | |
| KR | 10-2020-0079060 | | 7/2020 | |
| KR | 10-2147675 | | 8/2020 | |
| KR | 20200122855 A * | 10/2020 | |
| KR | 10-2185231 | | 12/2020 | |
| KR | 10-2195857 | | 12/2020 | |
| KR | 102195857 B1 * | 12/2020 | |
| KR | 10-2216718 | | 2/2021 | |
| KR | 10-2274942 | | 7/2021 | |
| KR | 10-2278546 | | 7/2021 | |
| KR | 10-2319017 | | 11/2021 | |
| WO | WO-2015079673 A1 * | 6/2015 | ............ F24F 11/30 |
| WO | WO 2020/255308 | | 12/2020 | |
| WO | WO-2022124668 A1 * | 6/2022 | ............ F24F 1/0063 |
| WO | WO-2022124684 A1 * | 6/2022 | ........... F24F 11/0001 |
| WO | WO-2023022385 A1 * | 2/2023 | ......... B01D 46/0049 |
| WO | WO-2023090594 A1 * | 5/2023 | ............ F24F 11/65 |
| WO | WO-2023132454 A1 * | 7/2023 | ........... F24F 11/0001 |

OTHER PUBLICATIONS

Extended European Search Report dated Oct. 25, 2024 for European Application No. 22895803.9.

* cited by examiner

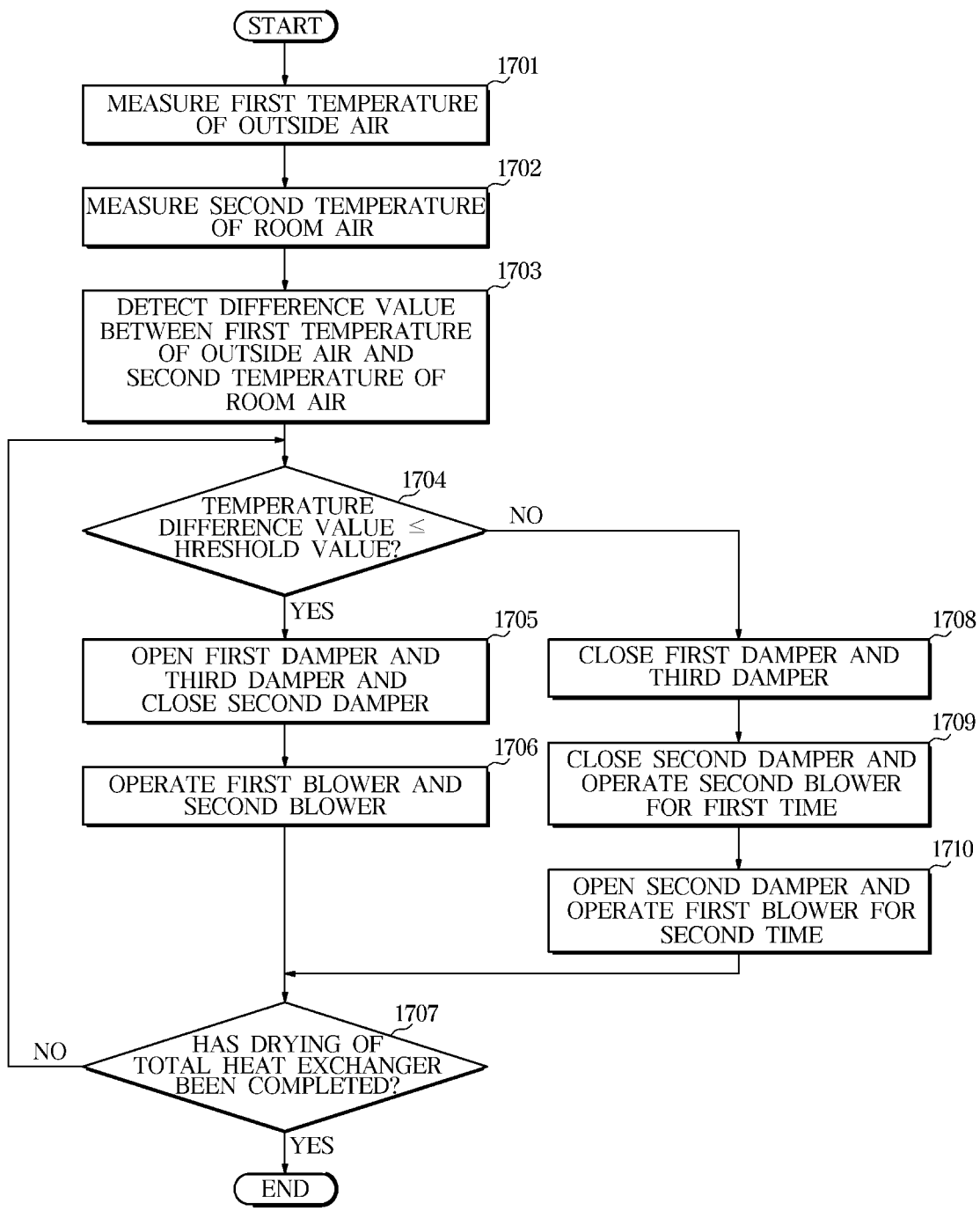

VENTILATION APPARATUS AND CONTROL METHOD THEREOF

CROSS-REFERENCE TO RELATED APPLICATION

This application is a continuation application, under 35 U.S.C. § 111(a), of International Application No. PCT/KR2022/013024, filed on Aug. 31, 2022, which claims priority to Korean Patent Application No. 10-2021-0160695, filed on Nov. 19, 2021 in the Korean Intellectual Property Office, the disclosure of which is incorporated by reference herein in its entirety.

BACKGROUND

1. Field

The disclosure relates to a ventilation apparatus for providing fresh air to an indoor space and a control method thereof.

2. Description of the Related Art

A ventilation apparatus is an apparatus for supplying outside air into an indoor space or exchanging room air with outside air to ventilate the indoor space. Existing ventilation apparatuses adjust room temperature and humidity only by performing total heat exchanging between outside air and room air through a total heat exchanger. Accordingly, outside air supplied to an indoor space is insufficiently dehumidified, and there are difficulties in maintaining comfort room temperature and humidity.

Recently, as the quality of room air, sanitation, and cleanliness are emphasized, ventilation apparatuses are increasing in use, and interest in internal contamination of the ventilation apparatuses is growing accordingly. One of components of a ventilation apparatus, which consumers can replace, is a total heat exchanger. In many cases, consumers cannot recognize a replacement of the total heat exchanger, which may result in contamination accumulation of the total heat exchanger and the propagation of bacteria and mold inside the total heat exchanger.

SUMMARY

Additional aspects of the disclosure will be set forth in part in the description which follows and, in part, will be obvious from the description, or may be learned by practice of the disclosure.

A ventilation apparatus according to an embodiment of the disclosure includes: a housing including a first inlet through which outside air is suctioned into the housing, a second inlet through which room air is suctioned into the housing, a first outlet through which the outside air is discharged to an indoor space, and a second outlet through which the room air is discharged to an outdoor space; an outside temperature sensor configured to measure a first temperature of the outside air; a room temperature sensor configured to measure a second temperature of the room air; a total heat exchanger to perform heat exchange between the outside air and the room air; a first blower connectable with the first outlet; a second blower connectable with the second outlet; and a processor configured to perform a drying operation to dry the total heat exchanger by operating at least one of the first blower while the first blower is connected to the first outlet and the second blower while the second blower is connected to the second outlet, based on a difference value between the first temperature and the second temperature.

The processor may be further configured to perform a first drying operation of operating both the first blower and the second blower, according to an identification that the difference value between the first temperature of the outside air and the second temperature of the room air is smaller than or equal to a preset threshold value; and perform a second drying operation of alternately operating the first blower and the second blower, according to an identification that the difference value between the first temperature of the outside air and the second temperature of the room air is greater than the preset threshold value.

The ventilation apparatus may further include a first damper formed between the first inlet and the first outlet, and the first damper to open or close a bypass flow path bypassing the total heat exchanger; a second damper to open or close a connecting flow path formed between the first inlet and the second inlet; and a third damper to open or close the first inlet, wherein the processor is further configured to control the first damper, the second damper, and the third damper based on the first drying operation or the second drying operation.

The processor may be configured to open the first damper and the third damper and close the second damper during the first drying operation.

The processor may be configured to close, during the second drying operation, the first damper and the third damper, and alternately close and open the second damper in correspondence to an alternate operation of the second blower and the first blower.

The processor may be configured to close the second damper and operate the second blower for a first predetermined time, and open the second damper and operate the first blower for a second predetermined time after the first predetermined time elapses.

The processor may be configured to set the first predetermined time to a longer time than the second predetermined time.

The ventilation apparatus may further include: a first duct connectable with the first outlet and provided outside the housing; a second duct connectable with the second inlet and provided outside the housing; a third duct connecting the first duct with the second duct, and forming a return flow path between the first outlet and the second inlet; and a fourth damper provided inside the third duct and opening or closing the return flow path.

The processor may be configured to open, during the second drying operation, the fourth damper in correspondence to an operation of the first blower and close the fourth damper in correspondence to a stop of the first blower.

The ventilation apparatus may further include a heat exchanger provided between the total heat exchanger and the first blower and configured to dehumidify air passed through the total heat exchanger.

The processor may be configured to perform the drying operation to dry the total heat exchanger based on a preset schedule.

The ventilation apparatus may further include an inputter configured to obtain a user input, wherein the processor may be configured to perform the drying operation to dry the total heat exchanger based on the user input including a drying command for the total heat exchanger.

A method for controlling a ventilation apparatus, the method comprising: measuring a first temperature of outside air which is suctioned into a housing of the ventilation apparatus through a first inlet; measuring a second temperature of room air which is suctioned into the housing of the ventilation apparatus through the second inlet; detecting a difference value between the first temperature of the outside air discharged into an indoor space through a first outlet and the second temperature of the room air discharged to an outdoor space through a second outlet; and performing a drying operation for a total heat exchanger, which performs heat exchange between the outside air and the room air, by operating at least one of a first blower while the first blower is connected with the first outlet and a second blower while the second blower is connected with the second outlet, based on the difference value between the first temperature and the second temperature.

The performing of the drying operation for the total heat exchanger may include: performing a first drying operation of operating both the first blower and the second blower, according to an identification that the difference value between the first temperature and the second temperature is smaller than or equal to a preset threshold value; and performing a second drying operation of alternately operating the first blower and the second blower, according to an identification that the difference value between the first temperature and the second temperature is greater than the preset threshold value.

The performing of the first drying operation may include: opening a first damper provided in a bypass flow path bypassing the total heat exchanger; closing a second damper provided in a connecting flow path between the first inlet and the second inlet; and opening a third damper provided in the first inlet.

The performing of the second drying operation may include: closing a first damper provided in a bypass flow path bypassing the total heat exchanger; closing a third damper provided in the first inlet; and alternately closing and opening a second damper provided in a connecting flow path between the first inlet and the second inlet, in correspondence to an alternate operation of the second blower and the first blower.

The performing of the second drying operation may include: closing the second damper and operating the second blower for a first time; and opening the second damper and operating the first blower for a second time after the first time elapses.

The first time may be set to a longer time than the second time.

The performing of the second drying operation may include: opening a fourth damper provided inside a duct forming a return flow path between the first outlet and the second inlet, in correspondence to an operation of the first blower; and closing the fourth damper in correspondence to a stop of the first blower.

The performing of the second drying operation may include dehumidifying air passed through the total heat exchanger by using a heat exchanger provided between the total heat exchanger and the first blower.

BRIEF DESCRIPTION OF THE DRAWINGS

The above and other aspects, features, and advantages of certain embodiments of the present disclosure will become apparent from the following description of the embodiments, taken in conjunction with the accompanying drawings of which:

FIG. 17 is a flowchart detailedly illustrating the method for controlling the ventilation apparatus, described in FIG. 16.

DETAILED DESCRIPTION

Figure 1:
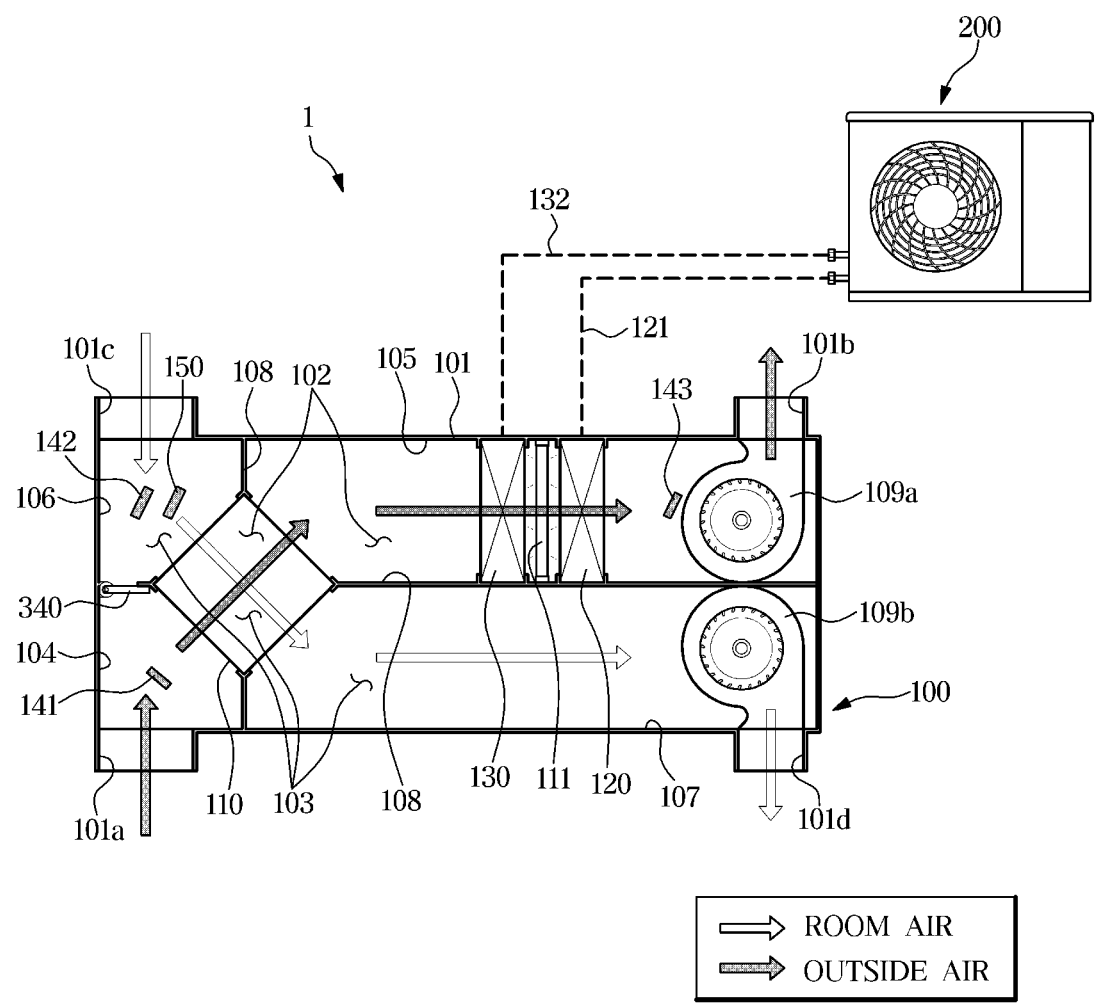
FIG. 1 shows a ventilation system including a ventilation apparatus according to an embodiment of the disclosure.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Like reference numerals or symbols denoted in the drawings of the present specification represent members or components that perform the substantially same functions. In the drawings, for easy understanding, the shapes or sizes of components are more or less exaggeratedly shown.

Throughout this specification, it will be understood that when a certain part is referred to as being "connected" with another part, it can be directly or indirectly connected with the other part. When a part is indirectly connected with another part, it may be connected with the other part through a wireless communication network or via another part.

The terms used in the present specification are merely used to describe embodiments, and are not intended to limit and/or restrict the disclosure. An expression used in the singular encompasses the expression of the plural, unless it has a clearly different meaning in the context. In the present specification, it is to be understood that the terms such as "including" or "having," etc., are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

In addition, the terms "portion", "device", "block", "member", and "module" used herein refer to a unit for processing at least one function or operation. For example, the terms may mean at least one process that may be processed by at least one hardware such as field-programmable gate array (FPGA) or application specific integrated circuit (ASIC), or at least one software or processor stored in a memory.

Reference numerals used in operations are provided to identify the operations, without describing the order of the operations, and the operations can be executed in a different order from the stated order unless a specific order is definitely specified in the context.

Throughout the disclosure, the expression "at least one of a, b or c" indicates only a, only b, only c, both a and b, both a and c, both b and c, all of a, b, and c, or variations thereof.

Therefore, it is an aspect of the disclosure to provide a ventilation apparatus capable of efficiently drying a total heat exchanger, and a control method thereof.

Hereinafter, embodiments of the disclosure will be described in detail with reference to the accompanying drawings.

Figure 2:
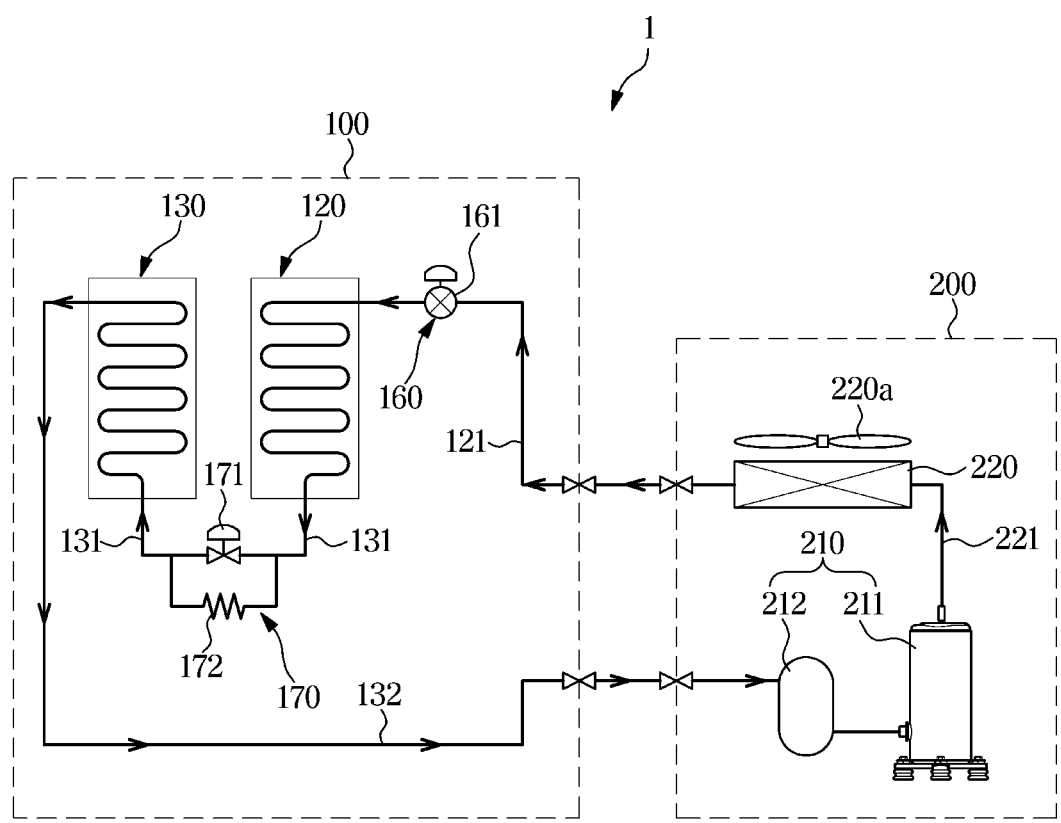
FIG. 2 is a top view showing an inside of a ventilation apparatus according to an embodiment of the disclosure.
Figure 3:
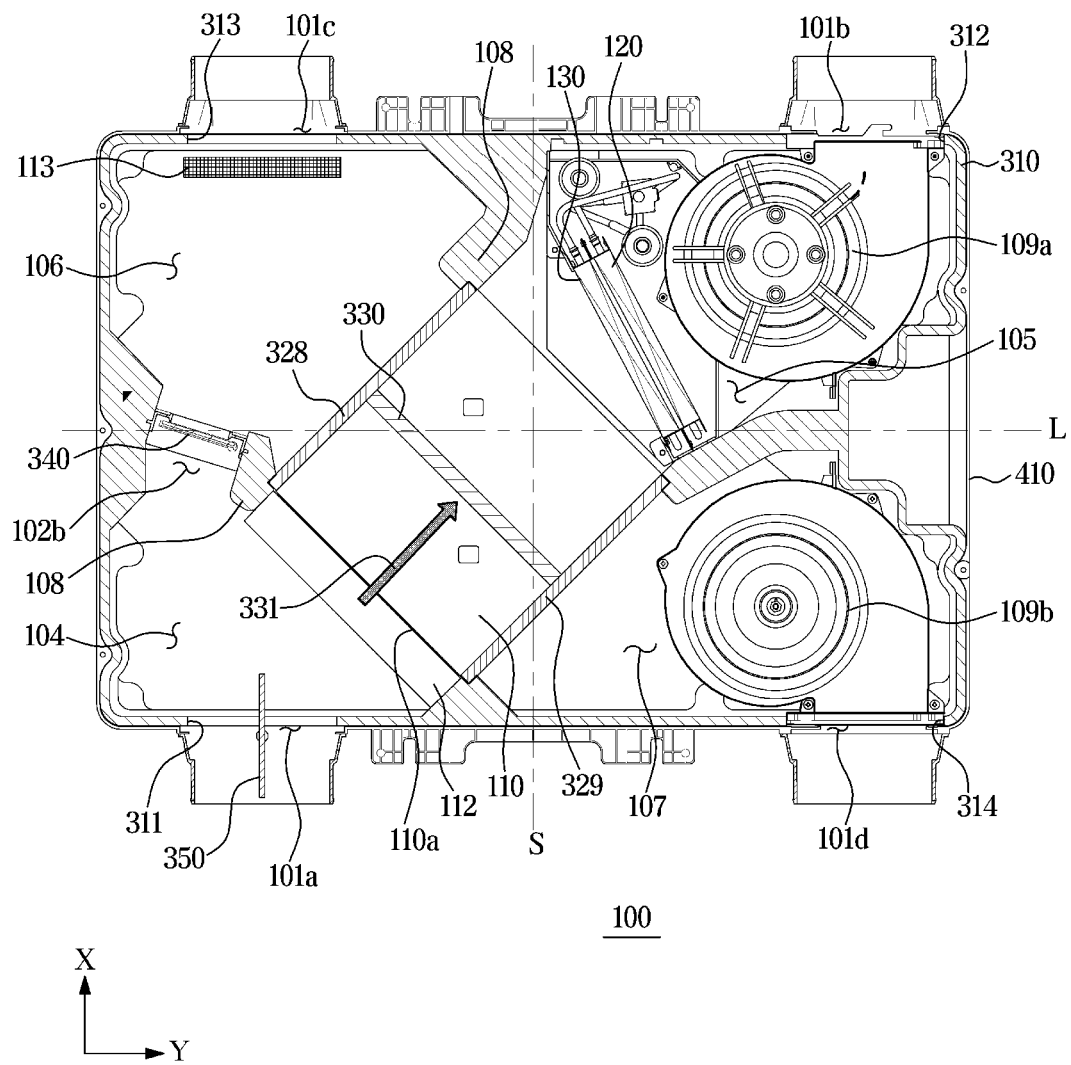
FIG. 3 shows a circulation of a refrigerant in a ventilation system according to an embodiment of the disclosure.

FIG. 1 shows a ventilation system including a ventilation apparatus according to an embodiment of the disclosure. FIG. 2 is a top view showing an inside of a ventilation apparatus according to an embodiment of the disclosure. FIG. 3 shows a circulation of a refrigerant in a ventilation system according to an embodiment of the disclosure.

Referring to FIGS. 1, 2, and 3, a ventilation system 1 may include a ventilation apparatus 100 that communicates with an indoor space and an outdoor space to exchange room air with outside air, and an outdoor unit 200 for circulating a refrigerant to be supplied to the ventilation apparatus 100.

The outdoor unit 200 may include a compressor 210 and a condenser 220. The compressor 210 may include an accumulator 212 and a compressor body 211. The condenser 220 is also referred to as an 'outdoor heat exchanger'. The compressor 210 may be connected with the condenser 220 through a refrigerant pipe 221. The outdoor unit 200 may include a cooling fan 220a to adjust temperature of the condenser 220. The cooling fan 220a may discharge air toward the condenser 220 to cool the condenser 220. Because the condenser 220 is cooled by the cooling fan 220a, temperature of a refrigerant passed through the condenser 220 may be lower than in a case in which the cooling fan 220a does not exist.

The outdoor unit 200 may correspond to an outdoor unit for an air conditioner known in the art, and therefore, one of ordinary skill in the art may easily change or add various components required to operate the outdoor unit 200. As such, the ventilation system 1 may operate by using an existing outdoor unit 200, and therefore, the ventilation apparatus 100 may be miniaturized and reduce production costs because the ventilation apparatus 100 includes no separate component such as a compressor.

The ventilation apparatus 100 may include a housing 101 forming an outer appearance. The housing 101 may be substantially in a shape of a box. The housing 101 may include an intake flow path 102 for sucking outside air in and guiding the outside air to an indoor space, and an exhaust flow path 103 for guiding room air to outside. The intake flow path 102 may be partitioned from the exhaust flow path 103 by a plurality of partition walls 108.

The housing 101 may include a first intake room 104 including a first inlet 101a which communicates with an outdoor space and through which outside air is sucked to inside of the housing 101, wherein the intake flow path 102 may be formed inside the first intake room 104, and a second intake room 105 including a first outlet 101b which communicates with the indoor space and through which outside air sucked to the inside of the housing 101 is discharged to the indoor space, wherein the intake flow path 102 may be formed inside the second intake room 102. The intake flow path 102 may connect the first inlet 101a with the first outlet 101b.

The housing 101 may include a first exhaust room 106 including a second inlet 101c which communicates with the indoor space and through which room air is sucked to the inside of the housing 101, wherein the exhaust flow path 103 may be formed inside the first exhaust room 106, and a second exhaust room 107 including a second outlet 101d which communicates with the outdoor space and through which the room air sucked to the inside of the housing 101 is discharged to the outside, wherein the exhaust flow path 103 may be formed inside the second exhaust room 107. The exhaust flow path 103 may connect the second inlet 101c with the second outlet 101d.

The ventilation apparatus 100 may include an intake blower 109a positioned inside the second intake room 105, generating blowing power required to suck outside air into the indoor space, and communicating with the first outlet 101b. The ventilation apparatus 100 may include an exhaust blower 109b positioned inside the second exhaust room 107, generating blowing power required to discharge room air to the outside, and communicating with the second outlet 101d. The intake blower 109a is also referred to as a 'first blower', and the exhaust blower 109b is also referred to as a 'second blower'.

The ventilation apparatus 100 may include a total heat exchanger 110 for heat-exchanging air flowing along the exhaust flow path 103 with air flowing along the intake flow path 102. The total heat exchanger 110 may be made of a paper material coated with lithium chloride, and the total heat exchanger 110 is also referred to as a 'total heat exchanging device'. The total heat exchanger 110 may be a plate type total heat exchanger or a rotary type total heat exchanger. The total heat exchanger 110 may be positioned at a location where the intake flow path 102 intersects with the exhaust flow path 103. That is, the total heat exchanger 110 may be considered as being positioned on both the intake flow path 102 and the exhaust flow path 103.

The total heat exchanger 110 may communicate the second intake room 105 with the second intake room 106. The total heat exchanger 110 may communicate the first exhaust room 106 with the second exhaust room 107. Outside air flowing through the intake flow path 102 may be heat-exchanged with room air flowing through the exhaust flow path 103 without being in contact with the room air inside the total heat exchanger 110.

The ventilation apparatus 100 may include a filter 112 for collecting foreign materials included in outside air. The filter 112 may be adjacent to the total heat exchanger 110. The total heat exchanger 110 may include an intake terminal 110a, and the filter 112 may face the intake terminal 110a of the total heat exchanger 110.

Preferably, the filter 112 may face the intake terminal 110a in such a way as to be in close contact with the intake terminal 110a. Accordingly, foreign materials flowing in outside air entered the filter 112 through the first inlet 101a may be filtered by the filter 112, and as a result, the total heat exchanger 110 may be prevented from being contaminated.

For example, the filter 112 may be a High Efficiency Particulate Air (HEPA) filter. The HEPA filter may be configured with glass fibers. The filter 112 may be a photocatalyst filter for inducing a chemical action of air by using photocatalyst. That is, the filter 112 may include photocatalyst, and collect various pathogens and bacteria existing in the air by inducing a chemical action by light energy of the photocatalyst. By catalyzing a chemical action, smell particles in the air may be decomposed, removed, or collected, although not limited thereto. However, the filter 112 may be one of various kinds of filters capable of collecting foreign materials.

An existing ventilation apparatus performs heat-exchange between outside air and room air by using a total heat exchanger installed therein, without being connected with an outdoor unit. The existing ventilation apparatus does not include a separate heat exchanger that is connected with the outdoor unit and receives a refrigerant from the outdoor unit. That is, the existing ventilation apparatus supplies outside air to an indoor space and exhausts room air to the outside without performing additional dehumidification.

However, the ventilation apparatus 100 may include heat exchangers 120 and 130 for adjusting humidity and temperature of air flowing through the intake flow path 102. The heat exchangers 120 and 130 are also referred to as 'dehumidification modules'. The heat exchangers 120 and 130 may remove moisture from air passing therethrough. Accordingly, dehumidified air may be supplied to the indoor space.

The heat exchangers 120 and 130 may be configured with a first heat exchanger 120 and a second heat exchanger 130. The heat exchangers 120 and 130 may be provided on the intake flow path 102. The heat exchangers 120 and 130 may be positioned inside the second intake room 105. That is, the first heat exchanger 120 and the second heat exchanger 130 may be positioned more downstream of the intake flow path 102 than the total heat exchanger 110.

The second heat exchanger 130 may be positioned more upstream of the intake flow path 102 than the first heat exchanger 120. In other words, the first heat exchanger 120 may be positioned more downstream of the intake flow path 102 than the second heat exchanger 130. Outside air sucked through the first inlet 101a may pass through the first intake room 104, the total heat exchanger 110, the second heat exchanger 130, and the first heat exchanger 120 in this order, and then be discharged to the indoor space through the first outlet 101b.

Air flowing along the intake flow path 102 from the first inlet 101a toward the first outlet 101b may be dehumidified by the second heat exchanger 130. Air passed through the second heat exchanger 130 may be heated by the first heat exchanger 120, or the air may be cooled and dehumidified.

The first heat exchanger 120 may be connected with the outdoor unit 200 by a first refrigerant pipe 121. The first heat exchanger 120 may be connected with the condenser 220 of the outdoor unit 200 by the first refrigerant pipe 121. The second heat exchanger 130 may be connected with the first heat exchanger 120 by a second refrigerant pipe 131. The second heat exchanger 130 may be connected with the outdoor unit 200 by a third refrigerant pipe 132. The second heat exchanger 130 may be connected with the accumulator 212 of the outdoor unit 200 by the third refrigerant pipe 132.

The ventilation apparatus 100 may include a first expander 160 provided in the first refrigerant pipe 121. The first expander 160 may selectively expand a refrigerant that is supplied to the first heat exchanger 120 via the first refrigerant pipe 121. The refrigerant passed through the first expander 160 may be reduced in pressure.

The ventilation apparatus 100 may include a second expander 170 provided in the second refrigerant pipe 131. The second expander 170 may selectively expand a refrigerant that is discharged from the first heat exchanger 120 to the second heat exchanger 130 via the second refrigerant pipe 131. The refrigerant passed through the second expander 170 may be reduced in pressure. The first expander 160 and the second expander 170 may be installed inside the housing 101. The second refrigerant pipe 131 may be installed inside the housing 101.

The first expander 160 may expand a high-temperature, high-pressure refrigerant to a low-temperature, low-pressure refrigerant by a throttling action, and adjust a flow rate of a refrigerant that is supplied to the first heat exchanger 120. The first expander 160 may reduce pressure of a refrigerant by a throttling action of a refrigerant by which a refrigerant passing through a narrow flow path is reduced in pressure without exchanging heat with the outside. For example, the first expander 160 may include an electronic expansion valve (EEV) 161. The electronic expansion valve 161 may adjust an expansion degree and flow rate of a refrigerant by adjusting a degree of opening. In a case in which the electronic expansion valve 161 fully opens, a refrigerant may pass through the electronic expansion valve 161 without resistance, and may be not expanded.

The second expander 170 may expand a high-temperature, high-pressure refrigerant to a low-temperature, low-pressure refrigerant by a throttling action. For example, the second expander 170 may include a solenoid valve 171 and a capillary tub 172 connected in parallel with the solenoid valve 171. Upon closing of the solenoid valve 171, a refrigerant may move to the capillary tub 172 to be throttled and expanded, and upon opening of the solenoid valve 171, a refrigerant may be not expanded by flowing through the solenoid valve 171 without resistance. To efficiently adjust the flow and expansion of the refrigerant, the solenoid valve 171 may be replaced with an electronic expansion valve (EEV), although not limited.

For example, both the first expander 160 and the second expander 170 may include an electronic expansion valve. The first expander 160 may include a solenoid valve and a capillary tube connected in parallel with the solenoid valve, and the second expander 170 may include an electronic expansion valve. Both the first expander 160 and the second expander 170 may include a solenoid valve and a capillary tube connected in parallel with the solenoid valve. The solenoid valve connected in parallel with the capillary tube may also be replaced with an electronic expansion valve.

The ventilation apparatus 100 may include an outside temperature sensor 141 for measuring first temperature (outside temperature) of outside air and a room temperature sensor 142 for measuring second temperature (room temperature) of room air. Also, the ventilation apparatus 100 may include a discharge temperature sensor 143 for measuring discharge temperature which is temperature of air discharged to the indoor space after passing through the heat exchangers 120 and 130. The ventilation apparatus 100 may include a room humidity sensor 150 for measuring room temperature. The room humidity may be relative humidity.

The outside temperature sensor 141 may be provided on the intake flow path 102. For example, the outside temperature sensor 141 may be positioned in the first intake room 104 between the first inlet 101a and the total heat exchanger 110, although not limited thereto. The outside temperature sensor 141 may be positioned outside the housing 101. The outside temperature sensor 141 is also referred to as a 'first temperature sensor'.

The room temperature sensor 142 and the room humidity sensor 150 may be provided on the exhaust flow path 103. The room temperature sensor 142 and the room humidity sensor 150 may be positioned inside the first exhaust room 106. The room temperature sensor 142 and the room humidity sensor 150 may be positioned more upstream of the exhaust flow path 103 than the total heat exchanger 110. The room temperature sensor 142 is also referred to as a 'second temperature sensor'.

The room temperature sensor 142 may measure temperature of room air sucked through the second inlet 101c, and the room humidity sensor 150 may measure humidity of the room air sucked through the second inlet 101c, although not limited thereto. The room temperature sensor 142 and the room humidity sensor 150 may be positioned outside the housing 101.

The discharge temperature sensor 143 may be provided on the intake flow path 102. The discharge temperature sensor 143 may be positioned inside the second intake room 105. The discharge temperature sensor 143 may be positioned more downstream of the intake flow path 102 than the total heat exchanger 110, the first heat exchanger 120, and the second heat exchanger 130. The discharge temperature sensor 143 may measure temperature of air that is discharged to the indoor space through the first outlet 101b, although not limited thereto. The discharge temperature sensor 143 may be positioned outside the housing 101. The discharge temperature sensor 143 is also referred to as a 'third temperature sensor'.

The ventilation apparatus 100 may include a first sterilizer 111 for sterilizing the first heat exchanger 120 and the second heat exchanger 130. The first sterilizer 111 may be positioned between the first heat exchanger 120 and the second heat exchanger 130. The first sterilizer 111 may sterilize the first heat exchanger 120 and the second heat exchanger 130 positioned at both sides, at the same time. The first sterilizer 111 may include an ultraviolet light source for irradiating ultraviolet light. For example, the first sterilizer 111 may include a UV-LED.

Also, the ventilation apparatus 100 may include a second sterilizer 113 for sterilizing room air sucked through the second inlet 101c. The second sterilizer 113 may be positioned inside the first exhaust room 106. For example, the second sterilizer 113 may include at least one of a heater, an infrared lamp, or a UV-LED.

The ventilation apparatus 100 for sucking outside air and ventilating an indoor space may provide operation modes of a first dehumidification mode, a second dehumidification mode, and a ventilation mode. The ventilation apparatus 100 may operate in one of the first dehumidification mode, the second dehumidification mode, and the ventilation mode based on room temperature and room humidity. A processor 192 of the ventilation apparatus 100 may control the ventilation apparatus 100 to operate in the first dehumidification mode, the second dehumidification mode, or the ventilation mode. The ventilation apparatus 100 may operate by switching to the first dehumidification mode, the second dehumidification mode, and the ventilation mode based on room temperature and room humidity.

The first dehumidification mode will be described below. In the first dehumidification mode, the first expander 160 may expand a refrigerant. The second expander 170 may expand or not expand a refrigerant. Preferably, the second expander 170 may not expand a refrigerant in the first dehumidification mode such that the refrigerant flows smoothly. For this, in the first dehumidification mode, the solenoid valve 171 of the second expander 170 may open.

A high-temperature, high-pressure refrigerant discharged from the compressor 211 may be condensed in the condenser 220 of the outdoor unit 200 and then enter the first expander 160. The first expander 160 may expand the high-temperature, high-pressure refrigerant to a low-temperature, low-pressure state such that the refrigerant is evaporated in the first heat exchanger 120 and the second heat exchanger 130.

The refrigerant expanded by the first expander 160 may enter the first heat exchanger 120, and exchange heat with air passing through the first heat exchanger 120 to thereby be evaporated. The refrigerant discharged from the first heat exchanger 120 and then entered the second heat exchanger 130 may be again evaporated in the second heat exchanger 130. The first heat exchanger 120 and the second heat exchanger 130 may remove moisture included in the air passing through the first heat exchanger 120 and the second heat exchanger 130 by condensing the air, and cool the air passing through the first heat exchanger 120 and the second heat exchanger 130. That is, the ventilation apparatus 100 which operates in the first dehumidification mode may lower both temperature and humidity of outside air sucked to the indoor space.

Air supplied to the indoor space by the ventilation apparatus 100 operating in the first dehumidification mode may have temperature and humidity at which a user may feel comfortable. Because the ventilation apparatus 100 operating in the first dehumidification mode discharges cooled and dried air to the indoor space, the first dehumidification mode is also referred to as a 'cooling dehumidification mode'.

The second dehumidification mode will be described below. In the second dehumidification mode, the first expander 160 may not expand a refrigerant. The second expander 170 may expand a refrigerant. A high-temperature, high-pressure refrigerant discharged from the compressor body 211 may be condensed by the condenser 220 of the outdoor unit 200 and then enter the first heat exchanger 120. The first heat exchanger 120 may condense the received refrigerant. The high-temperature, high-pressure refrigerant discharged from the first heat exchanger 120 may be expanded by the second expander 170 to become a low-temperature, low-pressure refrigerant. The expanded refrigerant may enter the second heat exchanger 130, and exchange heat with air passing through the second heat exchanger 130 to be evaporated.

In the second dehumidification mode, air flowing along the intake flow path 102 may pass through the second heat exchanger 130 and the first heat exchanger 120 in order. The second heat exchanger 130 may remove moisture included in the air passing through the second heat exchanger 130 by condensing the air, and accordingly, the air passing through the second heat exchanger 130 may be cooled and dehumidified. The first heat exchanger 120 may heat the air from which moisture has been removed by the second heat exchanger 130 by condensing the refrigerant. Because the air cooled by passing through the second heat exchanger 130 is heated by the first heat exchanger 120, temperature of the air passed through the first heat exchanger 120 may be higher than temperature of the air immediately passed through the second heat exchanger 130.

Therefore, relative humidity of the air passed through the second heat exchanger 130 and the first heat exchanger 120 may be lower than relative humidity of the air passed only through the second heat exchanger 130. Accordingly, air having temperature and humidity at which a user may feel comfortable may be supplied to the indoor space. Because the ventilation apparatus 100 operating in the second dehumidification mode discharges dried air having temperature that is the same as or similar to room temperature to the indoor space, the second dehumidification mode is also referred to as a 'fixed temperature dehumidification mode'.

In the ventilation mode, a refrigerant may be not supplied to the first heat exchanger 120 and the second heat exchanger 130, and only heat exchange between room air and outside air may occur in the total heat exchanger 110. The processor 192 may block a flow of a refrigerant that enters the ventilation apparatus 100, block a refrigerant entered the ventilation apparatus 100 from entering the first heat exchanger 120 and the second heat exchanger 130, or turn off the outdoor unit 200 to operate the ventilation apparatus 100 in the ventilation mode.

Referring to FIG. 3, the housing 101 may include a connecting flow path 102b connecting the first intake room 104 with the second intake room 106. The connecting flow path 102b may be positioned between the first intake room 102b and the second intake room 106, and may be positioned on a partition wall 108 partitioning the first intake room 104 from the second intake room 106. The connecting flow path 102b may be formed by cutting at least one portion of the partition wall 108. By opening the connecting flow path 102b, the first intake room 104 may communicate with the second intake room 106.

The ventilation apparatus 100 may include various dampers for opening or closing flow paths formed inside the ventilation apparatus 100. For example, a first damper 330 may open or close a bypass flow path 331 formed to bypass the total heat exchanger 110 between the first inlet 101a and the first outlet 101b. The first damper 330 may be positioned above or below the total heat exchanger 110.

A second damper 340 may be provided between one side of the total heat exchanger 110 and an inner wall of the housing 101. The second damper 340 may be positioned on the connecting flow path 102b. The second damper 340 may open or close the connecting flow path 102b formed between the first inlet 101a and the second inlet 101c. A third damper 350 may be provided in the first inlet 101a and open or close the first inlet 101a.

Although not shown in FIG. 3, the ventilation apparatus 100 may include a first duct 601 communicating with the first outlet 101b and provided outside the housing 101, a second duct 602 communicating with the second inlet 101c and provided outside the housing 101, and a third duct 603 connecting the first duct 601 with the second duct 602 and forming a return flow path between the first outlet 101b and the second inlet 101c. The ventilation apparatus 100 may include a fourth damper 360 provided inside the third duct 603 to open and close the third duct 603.

A degree of opening of each of the first damper 330, the second damper 340, the third damper 350, and the fourth damper 360 may be adjusted.

Meanwhile, as use of the ventilation apparatus 100 is accumulated, foreign materials (for example, dust) may be attached to a surface of the total heat exchanger 110. As a result of a great temperature difference (for example, a temperature difference that is greater than 5° C.) between outside temperature and room temperature, moisture may be generated by condensation during a process of heat exchange between room air and outside air in the total heat exchanger 110. In a case in which driving of the ventilation apparatus 100 is finished in a state in which moisture is generated in the total heat exchanger 110, a mold may be formed by the foreign materials (for example, dust) attached to the surface of the total heat exchanger 110 and the moisture. In a case in which air passed through the total heat exchanger 110 on which the mold is formed is supplied to the indoor space, quality of room air may deteriorate. Accordingly, by performing a drying operation for the total heat exchanger 110 in the ventilation apparatus 100, the total heat exchanger 110 may be prevented from being contaminated.

The drying operation for the total heat exchanger 110 may be performed based on a preset schedule. That is, the drying operation for the total heat exchanger 110 may be performed one time or repeated periodically according to a schedule. A schedule for drying the total heat exchanger 110 may change by a user input. Also, the drying operation for the total heat exchanger 110 may be performed in response to a user input including a dry command for the total heat exchanger 110. The user input may be obtained through an inputter 180 of the ventilation apparatus 100 or an inputter 52 of an integrated controller 50. The drying operation for the total heat exchanger 110 may be performed after a ventilation operation is finished.

The ventilation apparatus 100 may perform various drying operations for the total heat exchanger 110 according to a difference value between first temperature of outside air and second temperature of room air. By a ventilation operation (for example, the first dehumidification mode, the second dehumidification mode, or the ventilation mode) of the ventilation apparatus 100, room air may be maintained at appropriate temperature and humidity, and accordingly, the room air may be suitable to dry the total heat exchanger 110. The ventilation apparatus 100 may operate at least one of the first blower 109a or the second blower 109b based on a difference value between first temperature of outside air and second temperature of room air to perform a drying operation for the total heat exchanger 110. For example, according to an identification that a difference value between first temperature of outside temperature and second temperature of room air is smaller than or equal to a preset threshold value (for example, 5° C.), a first drying operation for the total heat exchanger 110 may be performed. During the first drying operation, both the first blower 109a communicating with the first outlet 101b and the second blower 109b communicating with the second outlet 101d may operate. Also, during the first drying operation, the first damper 330 for opening or closing the bypass flow path 331 may open, the third damper 330 provided in the first inlet 101*a* may open, and the second damper 340 provided in the connecting flow path 102*b* between the first inlet 101*a* and the second inlet 101*c* may be closed.

In other words, during the first drying operation, outside air sucked through the first inlet 101*a* may be guided to the first outlet 101*b* along the bypass flow path 331, without passing through the total heat exchanger 110. Room air sucked through the second inlet 101*c* may pass through the total heat exchanger 110 and then be discharged to the outside through the second outlet 101*d*. A flow path through which room air sucked through the second inlet 101*c* flows to the outside of the ventilation apparatus 100 is referred to as a 'first flow path'.

As another example, according to an identification that a difference value between first temperature of outside air and second temperature of room air is greater than the preset threshold value (for example, 5° C.), a second drying operation for the total heat exchanger 110 may be performed. During the second drying operation, the second blower 109*b* and the first blower 109*a* may operate alternately. Also, during the second drying operation, the first damper 330 may be closed, the third damper 350 may also be closed, and the second damper 340 may open and be closed alternately. During the second drying operation for the total heat exchanger 110, closing and opening of the second damper 340 may correspond to the alternate operation of the second blower 109*b* and the first blower 109*a*.

For a first time of the second drying operation, all of the first damper 330, the second damper 340, and the third damper 350 may be closed and the second blower 109*b* communicating with the second outlet 101*d* may operate. Also, the first blower 109*a* may stop. Accordingly, room air sucked through the second inlet 101*c* may pass through the total heat exchanger 110 and then be discharged to the outside through the second outlet 101*d*. In contrast, outside air may no longer enter through the first inlet 101*a*. In other words, for the first time, the total heat exchanger 110 may be dried through the first flow path for moving room air to the outside of the ventilation apparatus 100. A drying operation in which the second damper 340 is closed and the second blower 109*b* operates for the first time is referred to as a 'third drying operation'.

In the second drying operation, for a second time after the first time elapses, the first damper 330 and the third damper 350 may be closed, the second damper 340 may open, and the first blower 109*a* may operate. Also, for the second time, the second blower 109*b* may stop. Accordingly, room air sucked through the second inlet 101*c* may pass through the connecting flow path 102*b*, pass through the filter 112 and the total heat exchanger 110, and then be discharged to the indoor space through the first outlet 101*b*. For the second time, outside air may no longer enter through the first inlet 101*a*. A flow path through which sucked room air again flows to the indoor space is referred to as a 'second flow path'. In other words, for the second time, the total heat exchanger 110 may be dried by the second flow path through which room air again flows to the indoor space. A drying operation in which the second damper 340 opens and the first blower 109*a* operates for the second time is referred to as a 'fourth drying operation'. That is, the second drying operation may include the third drying operation and the fourth drying operation.

By performing the second drying operation using the first flow path and the second flow path sequentially, the total heat exchanger 110 may be dried in both directions, and drying efficiency may be improved.

Also, in the second drying operation for the total heat exchanger 110, the compressor 200 may operate to supply a refrigerant to the heat exchangers 120 and 130. Accordingly, air dehumidified by the heat exchangers 120 and 130 may be supplied to the indoor space through the first outlet 101*b*. In other words, the compressor 200 may operate for the second time after the first time elapses from a start of the second drying operation.

During the second drying operation, the fourth damper 360 may open in correspondence to an operation of the first blower 109*a*, and may be closed in correspondence to a stop of the first blower 109*a*. In other words, the fourth damper 360 may open for the second time after the first time elapses from a start of the second drying operation. The fourth damper 360 may be closed based on an elapse of the second time. Air dehumidified by passing through the heat exchangers 120 and 130 may be discharged through the first outlet 101*b* and then again guided to the second inlet 101*c* through the third duct 603.

The first time for the second drying operation may be set to a longer time than the second time. A sum of the first time and the second time may be a total drying time (for example, 20 minutes) for the total heat exchanger 110. That is, a sum of the first time and the second time may be a total drying time by the second drying operation. For example, the first time may be set to ⅔ of the total drying time, and the second time may be set to ⅓ of the total drying time, although not limited thereto. The first time and the second time may be set to different times according to a design.

In a process of drying the total heat exchanger 110, air passed through the total heat exchanger 110 may contain moisture. For the first time of the second drying operation, air passed through the total heat exchanger 110 may be discharged to the outside. For the second time of the second drying operation, air passed through the total heat exchanger 110 may be again supplied to the indoor space. Accordingly, setting the first time to a longer time than the second time may be more effective in maintaining good air quality of an indoor space.

Figure 4:
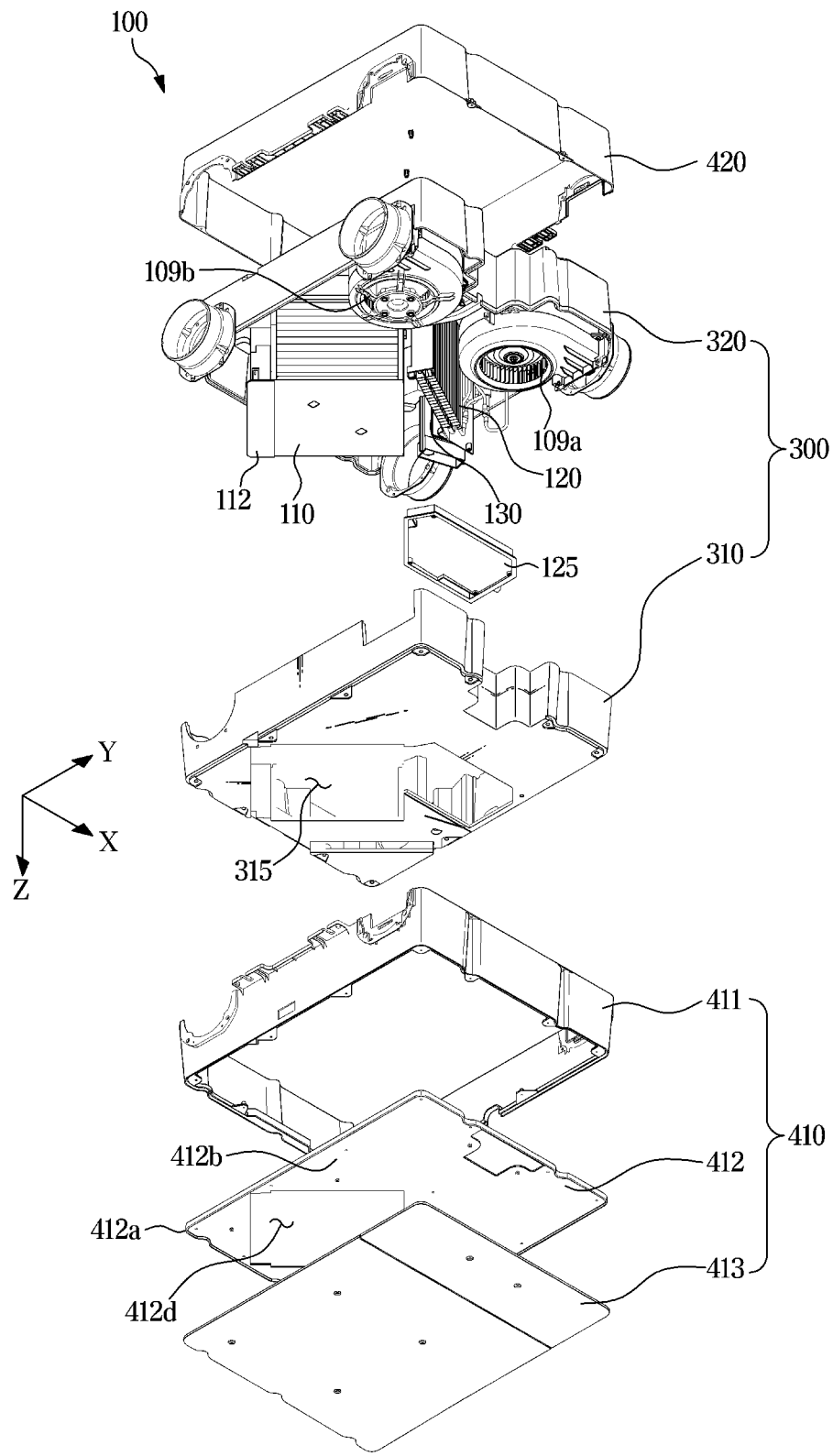
FIG. 4 is an exploded perspective view of a ventilation apparatus according to an embodiment of the disclosure.
Figure 5:
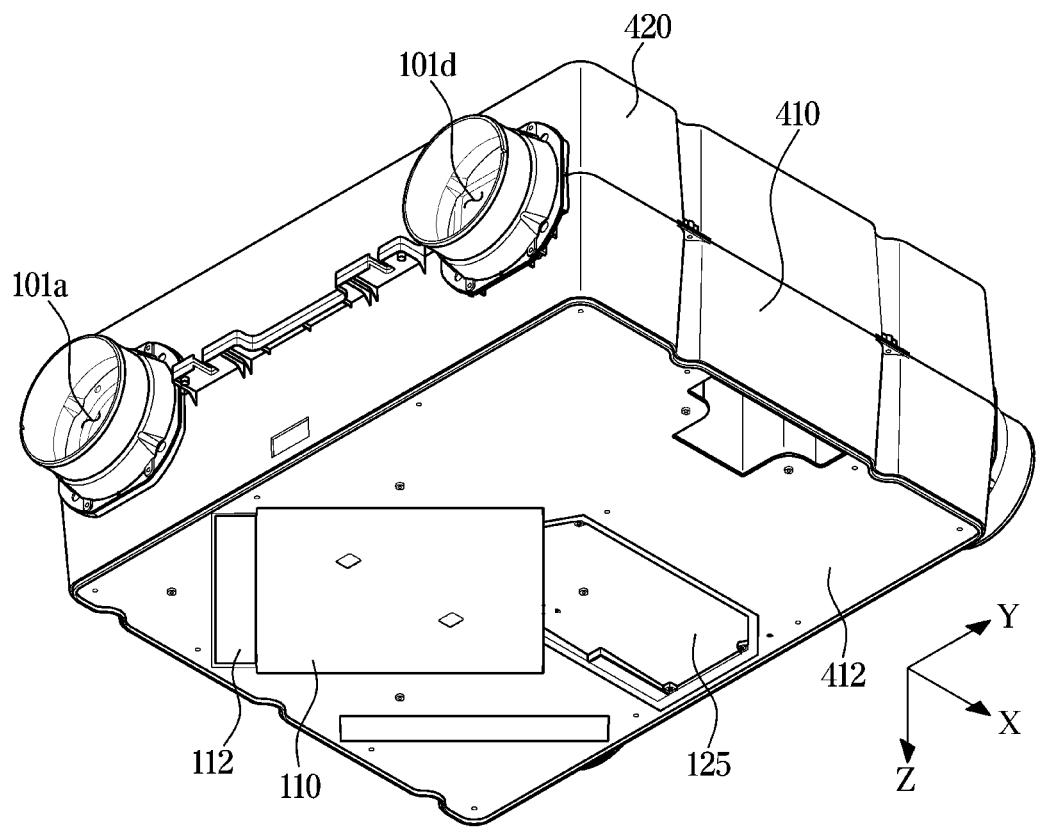
FIG. 5 is a perspective view showing a bottom of a ventilation apparatus according to an embodiment of the disclosure after some components of the ventilation apparatus are removed.
Figure 6:
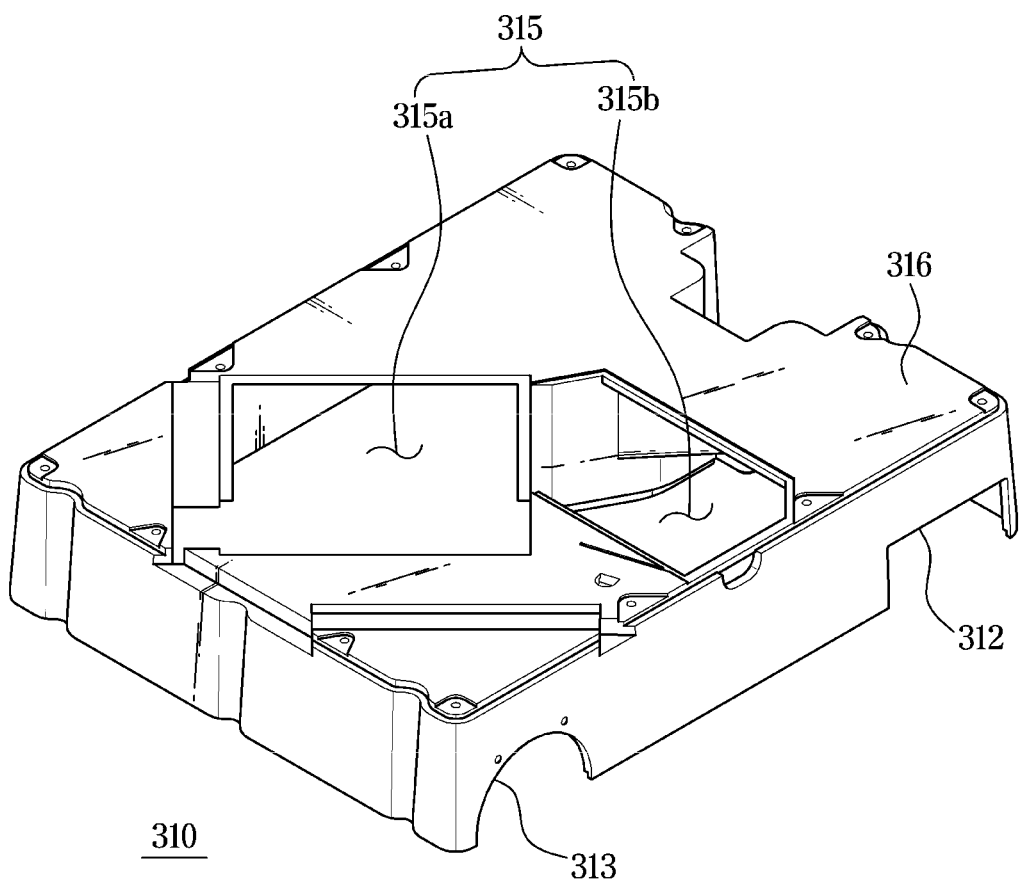
FIG. 6 shows a first internal housing of the ventilation apparatus shown in FIG. 4 after the first internal housing is turned up and down.
Figure 6:
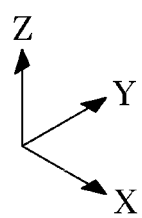
Figure 7:
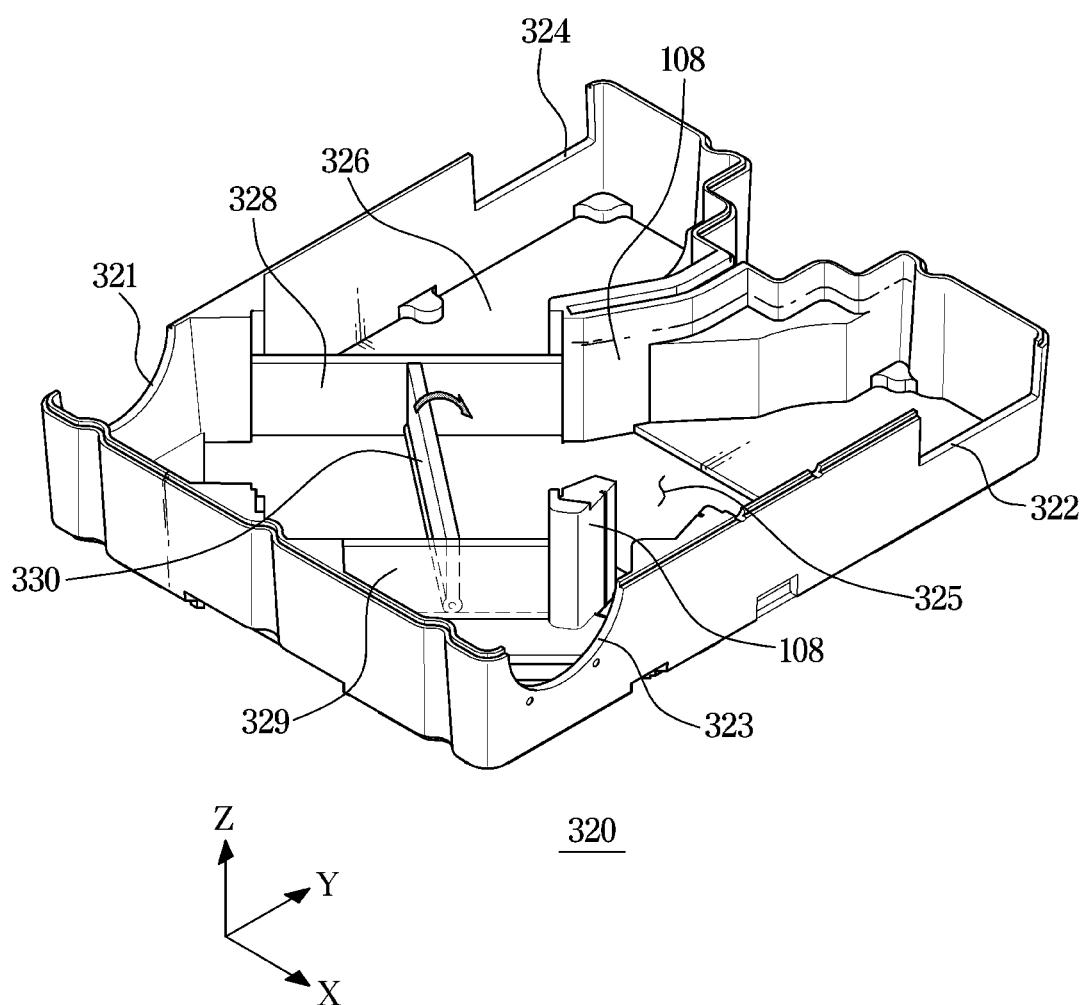
FIG. 7 shows a second internal housing of the ventilation apparatus shown in FIG. 4 after the second internal housing is turned up and down.

FIG. 4 is an exploded perspective view of a ventilation apparatus according to an embodiment of the disclosure. FIG. 5 is a perspective view showing a bottom of a ventilation apparatus according to an embodiment of the disclosure after some components of the ventilation apparatus are removed. FIG. 6 shows a first internal housing of the ventilation apparatus shown in FIG. 4 after the first internal housing is turned up and down. FIG. 7 shows a second internal housing of the ventilation apparatus shown in FIG. 4 after the second internal housing is turned up and down.

Referring to FIG. 4, the ventilation apparatus 100 may include a drain tray 125 for collecting condensed water generated by the heat exchangers 120 and 130. The drain tray 125 may be positioned below the heat exchangers 120 and 130 in an up-down direction Z.

The housing 101 may include a first internal housing 310 and a second internal housing 320. The second internal housing 320 may be coupled with the first internal housing 310 in the up-down direction Z. The first and second internal housings 310 and 320 may be provided as insulations. For example, the first and second internal housings 310 and 320 may be EPS insulations such as polystyrene, although not limited thereto. However, the first and second internal housings 310 and 320 may be formed of various insulations for maintaining air flowing through the intake flow path 102 and the exhaust flow path 103 at constant temperature.

The ventilation apparatus 100 may include covers 410 and 420 forming an outer appearance of the housing 101 and covering the first and second internal housings 310 and 320. The covers 410 and 420 may include a first cover 410 positioned at a lower location in the up-down direction Z, and a second cover 420 positioned above the first cover 410 and coupled with the first cover 410. The first cover 410 may form a lower outer appearance of the ventilation apparatus 100, and the second cover 420 may form an upper outer appearance of the ventilation apparatus 100. The first and second covers 410 and 420 may cover the first and second internal housings 310 and 320 to protect the first and second internal housings 310 and 320 from the outside. For example, the first and second covers 410 and 420 may be provided as plastic molded products.

The first internal housing 310 may be inserted in the first cover 410, and the second internal housing 320 may be inserted in the second cover 420. The first cover 410, the first internal housing 310, the second internal housing 320, and the second cover 420 may be positioned in this order in a direction from a lower portion of the ventilation apparatus 100 toward an upper portion of the ventilation apparatus 100.

Components of the ventilation apparatus 100, such as the total heat exchanger 110, the filter 112, the first and second blowers 109*a* and 109*b*, the heat exchangers 120 and 130, and the drain tray 125, may be supported by the first internal housing 310 and/or the second internal housing 320.

In the first internal housing 310, a first hole 315 may be provided. The total heat exchanger 110, the filter 112, and the drain tray 125 may be separable from the ventilation apparatus 100 through the first hole 315 of the first internal housing 310. The second internal housing 320 may include a second hole 325 corresponding to the first hole 315 of the first internal housing 310.

The first cover 410 may include a body portion 411 being in a shape of a quadrilateral frame, a plate portion 412 detachably coupled with the body portion 411 and being in a shape of a plate, and a lower cover portion 413 covering the plate portion 412 from below. The plate portion 412 of the first cover 410 may include a plate body 412*a*, a first surface 412*b* of the plate body 412*a*, and a second surface being opposite to the first surface 412*b*.

The plate portion 412 of the first cover 410 may include a third hole 412*d* corresponding to the first hole 315 of the first internal housing 310. The third hole 412*d* may be formed in the plate body 412*a*. Because the third hole 412*d* corresponds to the first hole 315, the third hole 412*d* may be asymmetrically formed in the plate body 412*a* with respect to any one of a longer axis L and a shorter axis S of the housing 101.

The plate portion 412 of the first cover 410 may be coupled with the body portion 411 such that the first surface 412*b* faces downward. The third hole 412*d* may be formed in the same shape as the first hole 315, and overlap with the first hole 315 in the up-down direction Z.

As shown in FIG. 5, upon separating of the lower cover 413 from the first cover 410, the total heat exchanger 110, the filter 112, and the drain tray 125 may be exposed from below the ventilation apparatus 100. Accordingly, a user may easily separate the total heat exchanger 110, the filter 112, and the drain tray 125 from the ventilation apparatus 100 as necessary.

Referring to FIG. 6, the first internal housing 310 may include a first inlet forming portion 311 (see FIG. 3) forming a portion of the first inlet 101*a*, a first outlet forming portion 312 forming a portion of the first outlet 101*b*, a second inlet forming portion 313 forming a portion of the second inlet 101*c*, and a second outlet forming portion 314 (see FIG. 3) forming a portion of the second outlet 101*d*. The first outlet forming portion 312 may be symmetrical to the second outlet forming portion 314 with respect to the longer axis L of the ventilation apparatus 100. The first inlet forming portion 311 may also be symmetrical to the second inlet forming portion 313 with respect to the longer axis L of the ventilation apparatus 100.

The first hole 315 through which the total heat exchanger 110, the filter 112, and the drain tray 125 are withdrawn may be divided into a first area 315*a* through which the total heat exchanger 110 and the filter 112 are withdrawn and a second area 315*b* through which the drain tray 125 is withdrawn. The first area 315*a* of the first hole 315 may be connected with the second area 315, although not limited thereto. However, the first area 315*a* may be separated from the second area 315*b*.

The total heat exchanger 110 may be in a shape of a regular hexahedron. The total heat exchanger 110 may have a square section. Because the filter 112 is adjacent to the intake terminal 110*a* of the total heat exchanger 110, the first area 315*a* of the first hole 315 may be in a shape of a rectangle. Through the first area 315*a* of the first hole 315, the total heat exchanger 110 and the filter 112 may be exposed to the outside.

The second area 315*b* of the first hole 315 may have a shape corresponding to the drain tray 125. For example, the second area 315*b* may be formed in a shape of a polygon, although not limited thereto. However, the second area 315*b* may have various shapes.

Referring to FIG. 7, the second internal housing 320 may include a first inlet forming portion 321 forming a portion of the first inlet 101*a*, a first outlet forming portion 322 forming a portion of the first outlet 101*b*, a second inlet forming portion 323 forming a portion of the second inlet 101*c*, and a second outlet forming portion 324 forming a portion of the second outlet 101*d*. The first outlet forming portion 322 may be symmetrical to the second outlet forming portion 324. The first inlet forming formation 321 may also be symmetrical to the second inlet forming portion 323.

By assembling the first internal housing 310 and the second internal housing 320 together in the up-down direction Z, the first inlet 101*a*, the first outlet 101*b*, the second inlet 101*c*, and the second outlet 101*d* may be formed. By positioning one surface of the first internal housing 310 in parallel to the other surface 326 of the second internal housing 320, the first hole 315 of the first internal housing 310 may also be positioned in parallel to the second hole 325 of the second internal housing 320.

A side in which the first inlet 101*a* and the second outlet 101*d* are positioned in a front-rear direction X is referred to as one side of the housing 101, and a side in which the second inlet 101*c* and the first outlet 101*b* are positioned is referred to as the other side of the housing 101. The total heat exchanger 110 may be adjacent to the one side of the housing 101. Because the heat exchangers 120 and 130 are adjacent to the first outlet 101*b* and the first blower 109*a* inside the second intake room 105, the total heat exchanger 110 may be most adjacent to the first inlet 101*a* to secure a wide space of the second intake room 105.

The first intake room 104, the second intake room 105, the first exhaust room 106, and the second exhaust room 107 may be partitioned by partition walls 108 formed by the first internal housing 310 and the second internal housing 320. Also, the partition walls 108 may function to support the total heat exchanger 110.

An upper surface of the total heat exchanger 110 may be spaced from the other surface 326 of the second internal housing 320. A vertical distance from the upper surface of the total heat exchanger 110 and the other surface 326 of the second internal housing 320 may depend on a design. A size of a space formed between the upper surface of the total heat exchanger 110 and the other surface 326 of the second internal housing 320 may also depend on the design.

A first molding 328 and a second molding 329 may be provided between the upper surface of the total heat exchanger 110 and the other surface 326 of the second internal housing 320. By the first molding 328 and the second molding 329, room air entered through the second inlet 101c may be prevented from flowing to the second outlet 101d through the space above the total heat exchanger 110. However, outside air entered through the first inlet 101a may flow to the first outlet 101b through the space above the total heat exchanger 110.

In the second internal housing 320, the first damper 330 may be provided. By coupling the first internal housing 310 with the second internal housing 320, the first damper 330 may be positioned above the total heat exchanger 110. The first damper 330 may open or close the bypass flow path 331 formed between the first inlet 101a and the first outlet 101b. In FIG. 7, the first damper 330 is shown to be positioned above the total heat exchanger 110, although not limited thereto. However, the first damper 330 may be positioned above or below the total heat exchanger 110.

Upon opening of the first damper 330, outside air sucked through the first inlet 101a may move to the first outlet 101b through the bypass flow path 331 formed between the upper surface of the total heat exchanger 110 and the second internal housing 320. In this case, the outside air may not pass through the total heat exchanger 110 due to a difference in flow velocity. During the first drying operation for the total heat exchanger 110, the first damper 330 may open.

The first damper 330 may be positioned between the first molding 328 and the second molding 329, and supported by the first molding 328 and the second molding 329. The first damper 330 may be positioned perpendicularly to the first molding 328 and the second molding 329, and may be rotatable. The first damper 330 may be in a shape of a rectangle. The first damper 330 may rotate toward the first intake room 104 or toward the first exhaust room 105.

Figure 8:
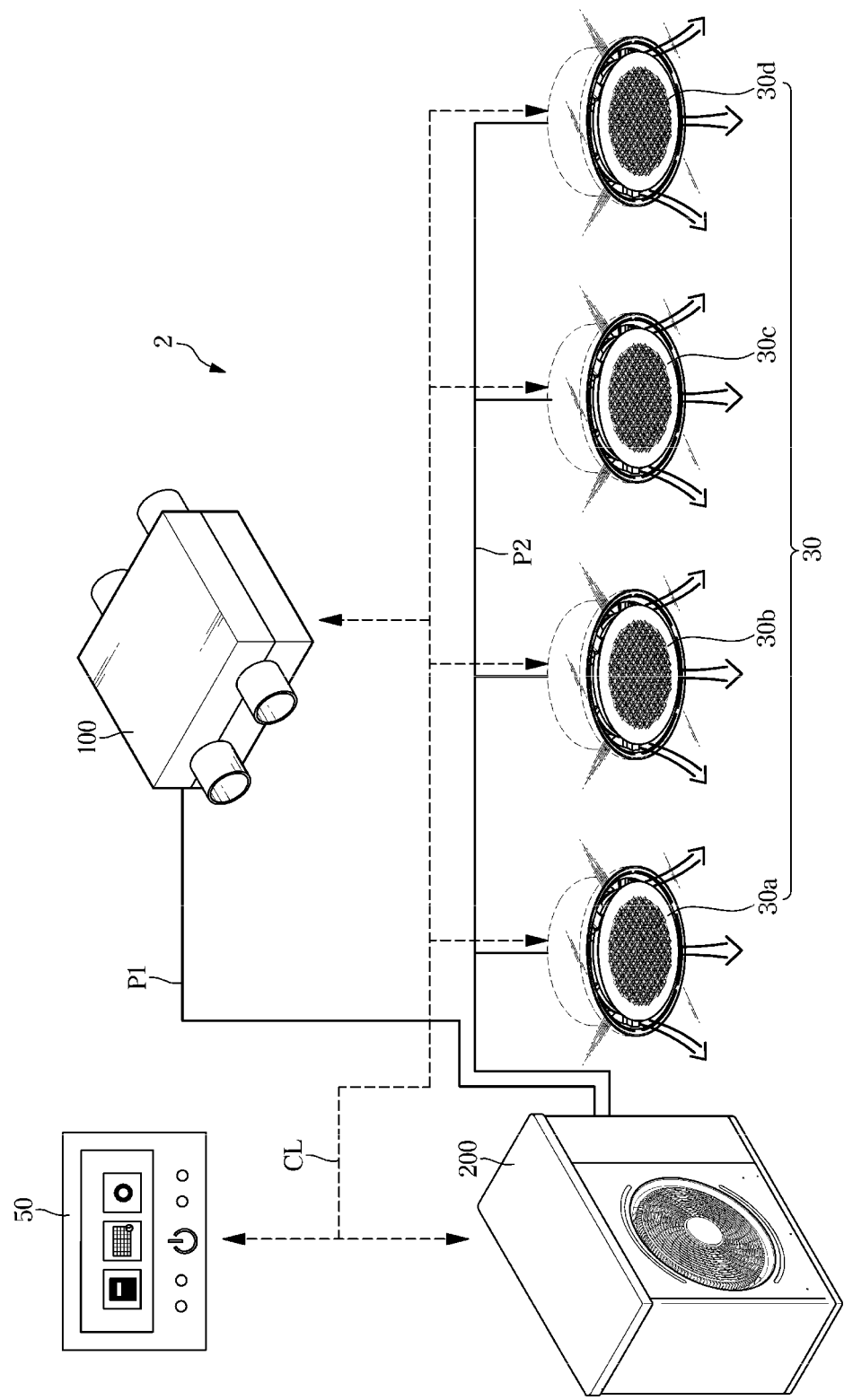
FIG. 8 shows an integrated air conditioning system including a ventilation apparatus according to an embodiment of the disclosure.
Figure 9:
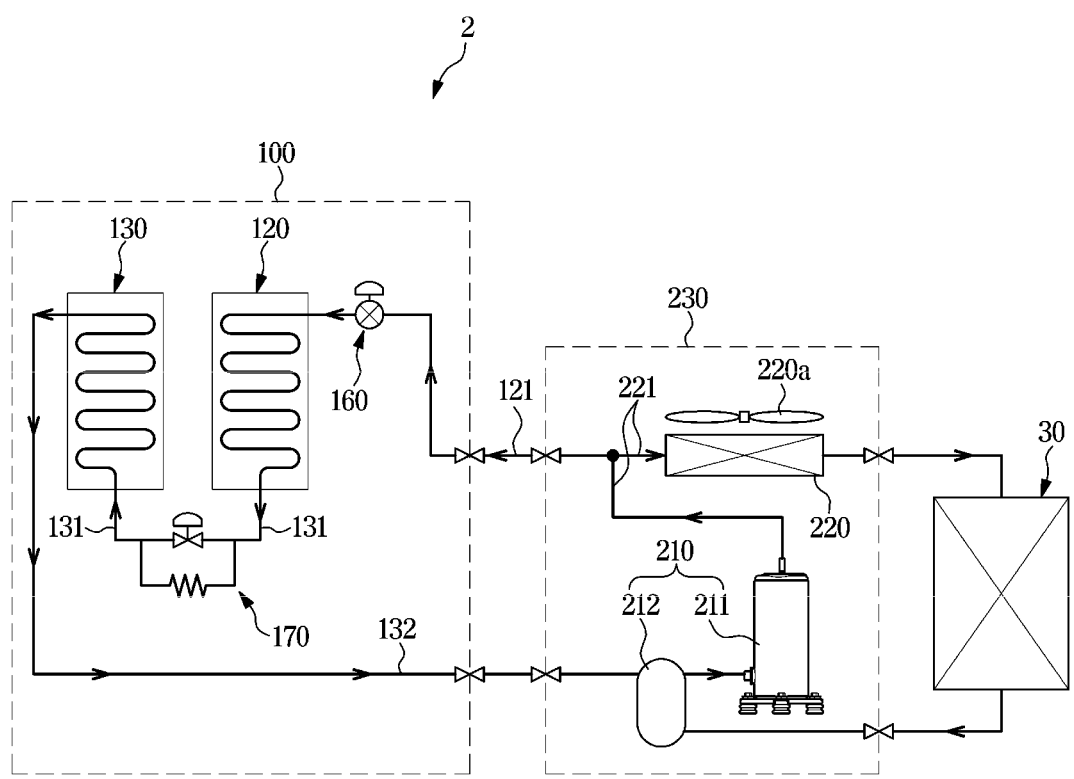
FIG. 9 shows a circulation of a refrigerant in an integrated air conditioning system according to an embodiment of the disclosure.

FIG. 8 shows an integrated air conditioning system including a ventilation apparatus according to an embodiment of the disclosure. FIG. 9 shows a circulation of a refrigerant in an integrated air conditioning system according to an embodiment of the disclosure.

Referring to FIG. 8, an integrated air conditioning system 2 may include the ventilation apparatus 100, the outdoor unit 200, a plurality of indoor units (30: 30a, 30b, 30c, and 30d), and an integrated controller 50. The ventilation apparatus 100 may be connected with the outdoor unit 200 by a refrigerant pipe P1. The refrigerant pipe P1 may correspond to the first refrigerant pipe 121 described above. The plurality of indoor units 30 may be connected with the outdoor unit 200 by a refrigerant pipe P2. The outdoor unit 200 may supply a refrigerant to each of the plurality of indoor units 30 through the refrigerant pipe P2.

The plurality of indoor units 30 may be respectively installed inside a plurality of different indoor spaces. For example, the plurality of indoor units 30 may be respectively installed in a plurality of offices, a plurality of guestrooms, or a plurality of rooms, which are partitioned inside a building. As a result of operating of the plurality of indoor units 30, indoor spaces where the plurality of indoor units 30 are respectively installed may be air-conditioned (for example, cooled).

The ventilation apparatus 100 may be installed in various spaces inside a building. For example, the ventilation apparatus 100 may be installed in a space, such as a balcony or utility room of an apartment. The first inlet 101a, the second inlet 101c, the first outlet 101b, and the second outlet 101d, provided in the housing 101 of the ventilation apparatus 100, may be respectively connected with ducts. Ducts connected with the second inlet 101c and the first outlet 101b may extend to an indoor space. For example, in a ceiling or wall of an indoor space, a hole communicating with the ventilation apparatus 100 may be provided. Ducts connected with the first inlet 101a and the second outlet 101d may extend to an outdoor space.

A single ventilation apparatus 100 and a single outdoor unit 200 are shown, however, one or more ventilation apparatuses 100 and one or more outdoor units 200 may be provided. Also, four indoor units 30 are shown. However, the number of the indoor units 30 is not limited to four. One or more indoor units 30 may be provided.

The integrated controller 50 may be electrically connected with the ventilation apparatus 100, the outdoor unit 200, and the plurality of indoor units 30. The integrated controller 50 may be electrically connected with the ventilation apparatus 100, the outdoor unit 200, and the plurality of indoor units 30 through a communication line CL. The integrated controller 50 may control operations of the ventilation apparatus 100, the outdoor unit 200, and the plurality of indoor units 30.

The integrated controller 50 may obtain a user input, operate the integrated air conditioning system 2 in response the user input, and display information of the integrated air conditioning system 2. The integrated controller 50 may control the ventilation apparatus 100 and the indoor units 30 based on room temperature and room humidity of indoor spaces where the indoor units 30 are installed.

By appropriately controlling operations of the ventilation apparatus 100 and the indoor units 300 based on room temperature and room humidity, cooling efficiency and dehumidification efficiency may be improved, and energy for cooling and dehumidification may be saved.

Referring to FIG. 9, the integrated air conditioning system 2 may include the ventilation apparatus 100, the outdoor unit 200, and a second apparatus 30. The outdoor unit 200 may be connected with the second apparatus 30. The second apparatus 30 may correspond to an 'indoor unit' of an air conditioner. The second apparatus 30 may receive a refrigerant discharged from the compressor 210 and then condensed in the condenser 220. Hereinafter, the second apparatus 30 will be referred to as an 'indoor unit'.

The outdoor unit 200 may also supply a refrigerant to the ventilation apparatus 100. A refrigerant discharged from the condenser 220 of the outdoor unit 200 may be supplied to the ventilation apparatus 100, or a refrigerant discharged from the compressor 210 of the outdoor unit 200 may be supplied to the ventilation apparatus 100.

For example, the first refrigerant pipe 121 may diverge from the refrigerant pipe 221 connecting the condenser 220 of the outdoor unit 200 with the compressor body 211 of the outdoor unit 200. A refrigerant not passed through the condenser 220 of the outdoor unit 200 may flow through the first refrigerant pipe 121, and a high-temperature, high-pressure refrigerant may be supplied to the first heat exchanger 120. At this time, the first expander 160 may expand or not expand a part of the refrigerant. Because the refrigerant flowing through the first refrigerant pipe 121 is a high-temperature, high-pressure refrigerant not condensed, the first heat exchanger 120 may function as a condenser for heating air while condensing a refrigerant. That is, the ventilation apparatus 100 may operate in the second dehumidification mode regardless of a degree of opening of the first expander 160. The ventilation apparatus 100 may also operate in the ventilation mode.

As another example, as described above with reference to FIG. 2, the first refrigerant pipe 121 may itself be connected with the condenser 210 of the outdoor unit 200. In this case, a refrigerant condensed in the condenser 220 may be supplied to the ventilation apparatus 100 through the first refrigerant pipe 121, although not limited thereto.

For example, a separate condenser (not shown) may be provided on the first refrigerant pipe 121. A refrigerant flowing through the first refrigerant pipe 121 may pass through the condenser (not shown) provided on the first refrigerant pipe 121 to be condensed and then enter the first expander 160 in the condensed state. The ventilation apparatus 100 may operate in the first dehumidification mode or the second dehumidification mode. The ventilation apparatus 100 may also operate in the ventilation mode.

A refrigerant discharged from the first heat exchanger 120 may be expanded by the second expander 170, and then enter the second heat exchanger 130. The second heat exchanger 130 may evaporate the refrigerant to thereby condense moisture in air and remove the moisture. In this way, the ventilation apparatus 100 and the indoor unit 30 may be driven at the same time by using the single outdoor unit 200.

The method for operating the ventilation apparatus 100, as described above, may also be applied to the integrated air conditioning system 2 described above with reference to FIGS. 8 and 9.

Figure 10:
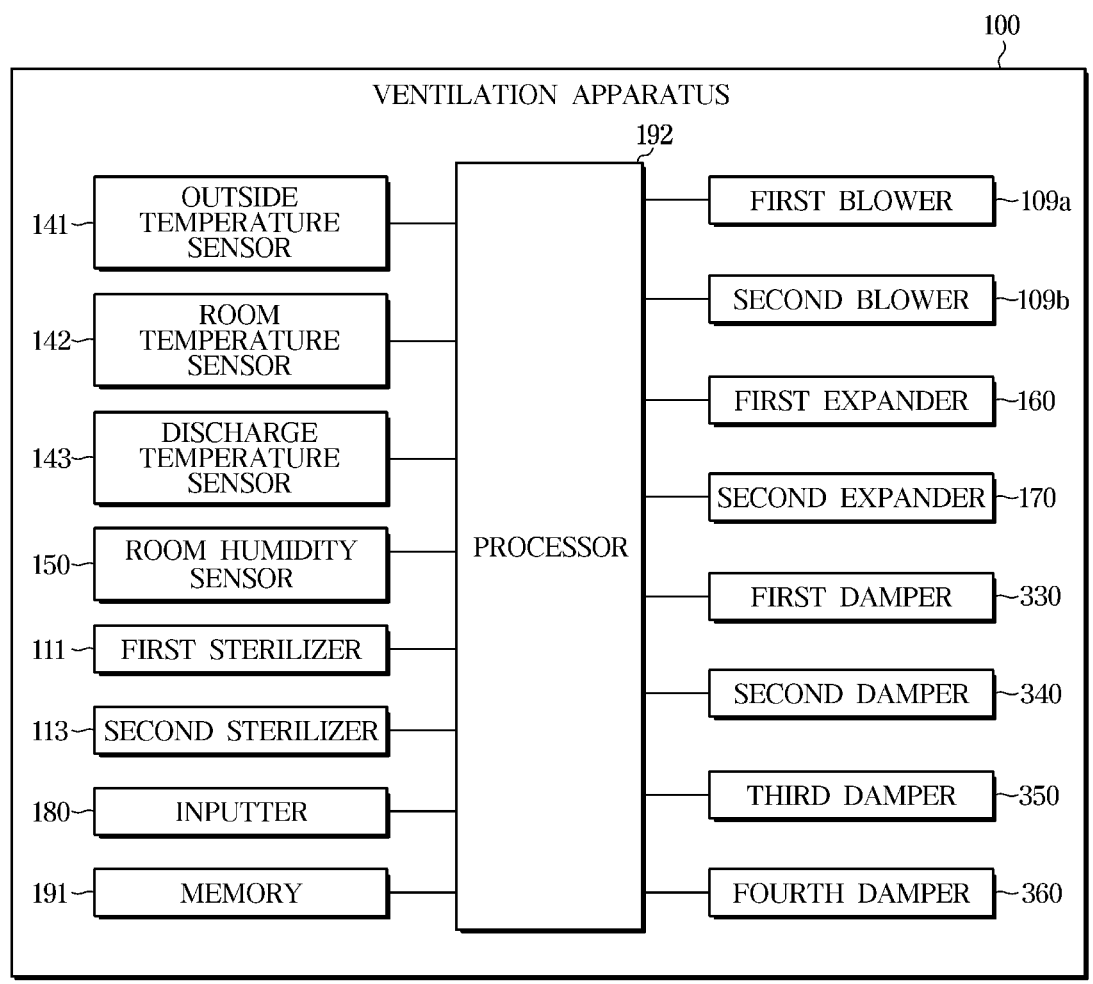
FIG. 10 is a control block diagram showing configurations of a ventilation apparatus according to an embodiment of the disclosure.

FIG. 10 is a control block diagram showing configurations of a ventilation apparatus according to an embodiment of the disclosure.

Referring to FIG. 10, the ventilation apparatus 100 may include, as described above, the outside temperature sensor 141, the room temperature sensor 142, the discharge temperature sensor 143, the room humidity sensor 150, the first sterilizer 111, the second sterilizer 112, the first blower 109a, the second blower 109b, the first expander 160, the second expander 170, the first damper 330, the second damper 330, the third damper 350, and the fourth damper 360.

Also, the ventilation apparatus 100 may include the inputter 180, the memory 191, and the processor 192. The processor 192 may be electrically connected with components of the ventilation apparatus 100, and control the individual components. For example, the processor 192 may adjust a degree of opening of each of the first damper 330, the second damper 340, the third damper 350, and the fourth damper 360.

The inputter 180 may obtain various user inputs for operations of the ventilation apparatus 100. The inputter 180 may output an electrical signal (voltage or current) corresponding to a user input to the processor 192 of the ventilation apparatus 100. The inputter 180 may include various buttons, a dial, and/or a touch display.

For example, the inputter 180 may obtain a user input including a drying command for the total heat exchanger 110. The processor 192 may perform a first drying operation or a second drying operation for the total heat exchanger 110, based on the drying command for the total heat exchanger 110. Also, the inputter 180 may obtain a user input for adjusting a schedule for drying the total heat exchanger 110. The processor 192 may perform the first drying operation or the second drying operation for the total heat exchanger 110 periodically based on a schedule set in advance according to a user input.

The memory 191 may memorize/store various information required for operations of the ventilation apparatus 100. The memory 191 may store instructions, applications, data, and/or programs required for operations of the ventilation apparatus 100. The processor 192 may generate control signals for controlling the operations of the ventilation apparatus 100 based on the instructions, applications, data, and/or programs stored in the memory 191.

Also, the ventilation apparatus 100 may include a communication interface for communicating with the outdoor unit 200 and/or the integrated controller 50. The ventilation apparatus 100 may operate based on a control signal transmitted from the integrated controller 50 through the communication interface.

As described above, as use of the ventilation apparatus 100 is accumulated, the total heat exchanger 110 may be contaminated. Due to moisture generated by heat-exchange between outside air and room air, a mold may be formed in the total heat exchanger 110. To properly manage the total heat exchanger 110, the total heat exchanger 110 may need to be dried. Drying the total heat exchanger 110 after the ventilation apparatus 100 completes an operation of sucking outside air and ventilating an indoor space may be preferable.

The processor 192 of the ventilation apparatus 100 may obtain first temperature (outside temperature) of outside air from the outside temperature sensor 141, and obtain second temperature (room temperature) of room air from the room temperature sensor 142. The processor 192 may operate at least one of the first blower 109a or the second blower 109b, based on a difference value between the first temperature of the outside air and the second temperature of the room air, and perform a drying operation for the total heat exchanger 110. According to an identification that the difference value between the first temperature of the outside air and the second temperature of the room air is smaller than or equal to a preset threshold value (for example, 5° C.), the processor 192 of the ventilation apparatus 100 may perform the first drying operation for the total heat exchanger 110. According to an identification that the difference value between the first temperature of the outside air and the second temperature of the room air is greater than the preset threshold value (for example, 5° C.), the processor 192 of the ventilation apparatus 100 may perform the second drying operation for the total heat exchanger 110.

The processor 192 of the ventilation apparatus 100 may perform a drying operation for the total heat exchanger 110 based on a preset schedule. That is, a drying operation for the total heat exchanger 110 may be performed one time or repeated periodically according to a schedule. The schedule for drying the total heat exchanger 110 may change by a user input. Also, the processor 192 may perform the first drying operation or the second drying operation in response to a user input including a drying command for the total heat exchanger 110.

The processor 192 of the ventilation apparatus 100 may open the first damper 330 and the third damper 350, close the second damper 340, and operate the first blower 109a and the second blower 109b, thereby performing the first drying operation.

During the first drying operation, outside air entered through the first inlet 101a as a result of opening of the first damper 330 may move to the first outlet 101b through the bypass flow path 331. That is, during the first drying operation, outside air may not pass through the total heat exchanger 110. In contrast, room air entered through the second inlet 101c may pass through the total heat exchanger 110 to dry the total heat exchanger 110. Because the total heat exchanger 110 is made of a paper material, the total heat exchanger 110 may be entirely dried only by passing room air through the total heat exchanger 110 in one direction. A flow path through which room air sucked through the second inlet 101c flows to the outside of the ventilation apparatus 100 is referred to as a 'first flow path'.

In a case in which a difference value between first temperature of outside air and second temperature of room air is smaller than or equal to the preset threshold value, an amount of heat exchange between the room air and the outside air may be relatively small. Therefore, no condensation may occur in the total heat exchanger 110 or an amount of condensation in the total heat exchanger 110 may be small. Accordingly, by performed only the first drying operation, the total heat exchanger 110 may be sufficiently dried.

During the second drying operation, the processor 192 of the ventilation apparatus 100 may close the first damper 330 and the third damper 350, alternately close and open the second damper 340, and alternately operate the second blower 109b and the first blower 109a.

As described above, the second drying operation may include the third drying operation and the fourth drying operation using different flow paths. For the second drying operation, the processor 192 may close the first damper 330, the second damper 340, and the third damper 350, and operate the second blower 109b for a first time. After the first time elapses, the processor 192 may also close the first damper 330 and the third damper 350, open the second damper 340, and operate the first blower 109a for a second time. Unlike this, the processor 192 may open the second damper 340 and operate the first blower 109a for the first time, and for the second time, the processor 192 may close the second damper 340 and operate the second blower 109b.

For the first time of the second drying operation, room air sucked through the second inlet 101c may pass through the total heat exchanger 110 along the first flow path, and then be discharged to the outside through the second outlet 101d. For the second time of the second drying operation, room air sucked through the second inlet 101c may pass through the total heat exchanger 110 along the second flow path and then be discharged to the indoor space through the first outlet 101b. By performing the second drying operation using the first flow path and the second flow path sequentially, the total heat exchanger 110 may be dried in both directions, and drying efficiency may be improved.

A sum of the first time and the second time for the second drying operation may be a total drying time (for example, 20 minutes) of the total heat exchanger 110. That is, a sum of the first time and the second time may be a total drying time by the second drying operation. The processor 192 may set the first time to a longer time than the second time. For example, the first time may be set to ⅔ of the total drying time, and the second time may be set to ⅓ of the total drying time, although not limited thereto. However, the first time and the second time for the second drying operation may be set to different times according to a design.

In a process of drying the total heat exchanger 110, air passed through the total heat exchanger 110 may contain moisture. For the first time of the second drying operation, air passed through the total heat exchanger 110 may be discharged to the outside of the ventilation apparatus 100. For the second time of the second drying operation, air passed through the total heat exchanger 110 may be again supplied to the indoor space. Accordingly, setting the first time to a longer time than the first time may be more effective in maintaining good air quality of an indoor space.

Also, during the second drying operation, the processor 192 of the ventilation apparatus 100 may operate the compressor 200 to supply a refrigerant to the heat exchangers 120 and 130, and control the first expander 160 and the second expander 170. Accordingly, air dehumidified by the heat exchangers 120 and 130 may be discharged to the indoor space through the first outlet 101b.

In addition, during the second drying operation, the processor 192 of the ventilation apparatus 100 may open the fourth damper 360 in correspondence to an operation of the first blower 109a, and close the fourth damper 360 in correspondence to a stop of the first blower 109a. In other words, for the second time of the second drying operation, the processor 192 may open the fourth damper 360 to open the return flow path formed by the third duct 603. Air dehumidified by passing through the heat exchangers 120 and 130 may be discharged through the first outlet 101b and then again guided to the second inlet 101c through the third duct 603. The processor 192 may close the fourth damper 360 based on an elapse of the second time and/or a stop of the first blower 109a.

Figure 11:
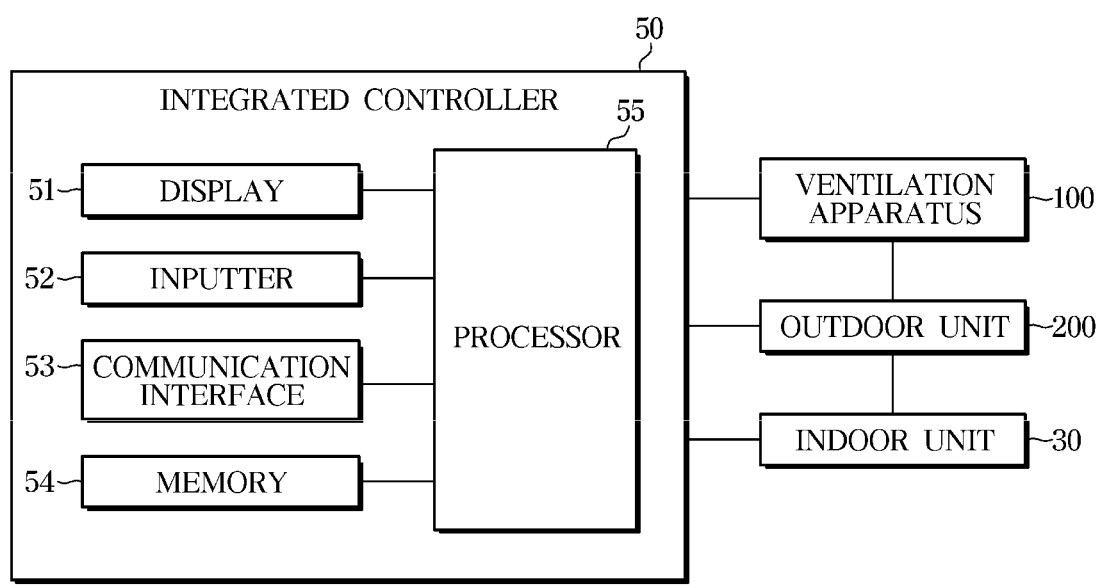
FIG. 11 is a control block diagram showing configurations of an integrated controller according to an embodiment of the disclosure.

FIG. 11 is a control block diagram showing configurations of an integrated controller according to an embodiment of the disclosure.

Referring to FIG. 11, the integrated controller 50 may include a display 51, the inputter 52, a communication interface 53, a memory 54, and a processor 55 electrically connected with the display 51, the inputter 52, the communication interface 53, and the memory 54. The integrated controller 50 may provide a user interface for interactions between the integrated air conditioning system 2 and a user.

The display 51 may display information about a state and/or operation of the integrated air conditioning system 2. The display 51 may display information input by the user or information to be provided to the user through various screens. The display 51 may display information related to an operation of the integrated air conditioning system 2 with at least one of an image or text. Also, the display 51 may display a Graphic User Interface (GUI) for enabling a control of the integrated air conditioning system 2. That is, the display 51 may display a User Interface (UI) element such as an icon.

The display 51 may include various types of display panels. For example, the display 51 may include a Liquid Crystal Display (LCD) panel, a Light Emitting Diode (LED) panel, an Organic Light Emitting Diode (OLED) panel, or a micro LED panel.

The display 51 may be implemented as a touch display. The touch display may include a display panel displaying an image, and a touch panel for receiving a touch input. The display panel may convert image data received from the processor 55 into an optical signal which is visible to a user. The touch panel may identify a touch input by a user, and provide an electrical signal corresponding to the touch input to the processor 55.

The inputter 52 of the integrated controller 50 may output an electrical signal (voltage or current) corresponding to a user input to the processor 55. The inputter 52 may include various buttons or a dial. In the display 51 implemented as a touch display, the inputter 52 may be not provided in the integrated controller 50. That is, the integrated controller 50 may obtain a user input. For example, the integrated controller 50 may obtain a user input for setting target temperature and target humidity, a user input for turning on or off the ventilation apparatus 100 and each of the indoor units 30, or a user input for setting an operation mode of the ventilation apparatus 100 and each of the indoor units 30.

The communication interface 53 may communicate with the ventilation apparatus 100, the outdoor unit 200, and the indoor units 30. The communication interface 53 of the integrated controller 50 may be connected with communication interfaces of the ventilation apparatus 100, the outdoor unit 200, and each of the indoor units 30 through the communication line CL. The integrated controller 50 may transmit a control signal to the ventilation apparatus 100, the outdoor unit 200, and the indoor units 30 through the communication interface 53.

Also, the communication interface 53 may include a wired communication module and/or a wireless communication module for communicating with an external device (for example, a mobile device or a computer). The wired communication module may communicate with an external device through a wide area network such as the Internet, and the wireless communication module may communicate with an external device through an access point connected with a wide area network. Thereby, a user may control the integrated air conditioning system 2 remotely.

The memory 54 may memorize/store various information required for operations of the integrated air conditioning system 2. The memory 54 may store instructions, applications, data, and/or programs required for operations of the integrated air conditioning system 2. For example, the memory 54 may store data about reference temperature and reference humidity for setting operations of the ventilation apparatus 100 and the indoor units 30.

The memory 54 may include a volatile memory, such as Static Random Access Memory (S-RAM) or Dynamic Random Access Memory (D-RAM), for memorizing data temporarily. Also, the memory 54 may include a non-volatile memory, such as Read Only Memory (ROM), Erasable Programmable Read Only Memory (EPROM), or Electrically Erasable Programmable Read Only Memory (EE-PROM), for storing data for a long time.

The processor 55 may generate a control signal for controlling an operation of the integrated air conditioning system 2 based on the instructions, applications, data, and/or programs stored in the memory 54. The processor 55 may include a logic circuit and an arithmetic circuit, as hardware. The processor 55 may process data according to a program and/or instruction provided from the memory 54 and generate a control signal according to a result of the processing. The memory 54 and the processor 55 may be implemented as a single control circuit or a plurality of circuits.

Meanwhile, components of the ventilation apparatus 100, the outdoor unit 200, the indoor units 30, and the integrated controller 50 are not limited to those described above with reference to FIGS. 10 and 11. Some of the components of the ventilation apparatus 100, the outdoor unit 200, the indoor units 30, and the integrated controller 50 may be omitted, or another component may be added.

Figure 12:
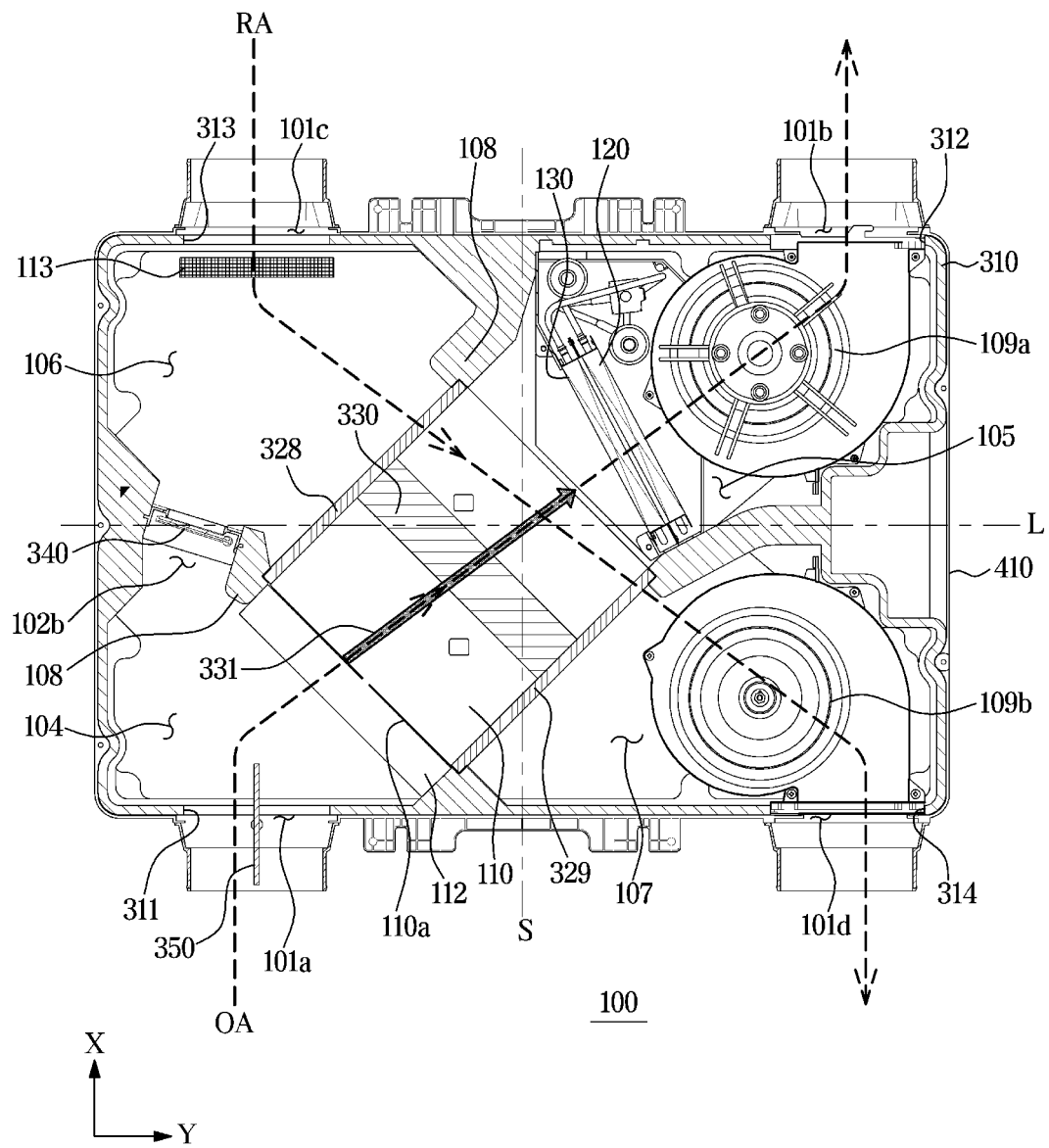
FIG. 12 shows a flow of air inside a ventilation apparatus according to an embodiment of the disclosure during a first drying operation of the ventilation apparatus.

FIG. 12 shows a flow of air inside a ventilation apparatus according to an embodiment of the disclosure during a first drying operation of the ventilation apparatus.

Referring to FIG. 12, during a second drying operation of the total heat exchanger 110, the first damper 330 may open to open the bypass flow path 331, the third damper 350 may open to open the first inlet 101a, and the second damper 340 provided in the connecting flow path 102b between the first inlet 101a and the second inlet 101c may be closed. Also, during a first drying operation, both the first blower 109a communicating with the first outlet 101b and the second outlet 101d communicating with the second outlet 101d may operate.

As a result of opening of the first damper 330, outside air OA entered through the first inlet 101a may move to the first outlet 101b through the bypass flow path 331 formed above the total heat exchanger 110. In this case, the outside air OA may not pass through the total heat exchanger 110 due to a difference in flow velocity. In contrast, room air RA entered through the second inlet 101c may pass through the total heat exchanger 110 to dry the total heat exchanger 110. Because the total heat exchanger 110 is made of a paper material, the total heat exchanger 110 may be entirely dried only by passing room air through the total heat exchanger 110 in one direction. A flow path through which room air sucked through the second inlet 101c flows to the outside of the ventilation apparatus 100 through the second outlet 101d is referred to as a 'first flow path'.

As described above, the first drying operation for the total heat exchanger 110 may be performed according to an identification that a difference value between first temperature of outside air OA and second temperature of room air RA is smaller than or equal to the preset threshold value (for example, 5° C.).

In a case in which the difference value between the first temperature of the outside air OA and the second temperature of the room air RA is smaller than or equal to the preset threshold value, an amount of heat exchange between the outside air OA and the room air RA may be relatively small. Therefore, no condensation may occur in the total heat exchanger 110 or an amount of condensation in the total heat exchanger 110 may be small. Accordingly, by performing only the first drying operation, the total heat exchanger 110 may be sufficiently dried.

Meanwhile, after the ventilation apparatus 100 operates in the ventilation mode for a preset time or more in a state in which a difference value between first temperature of outside air OA and second temperature of room air RA is smaller than the preset threshold value, a drying operation for the total heat exchanger 110 may be omitted. As the ventilation apparatus 100 operates in the ventilation mode, a difference between first temperature of outside air OA and second temperature of room air may become smaller, and a ventilation operation may dry the total heat exchanger 110.

Figure 13:
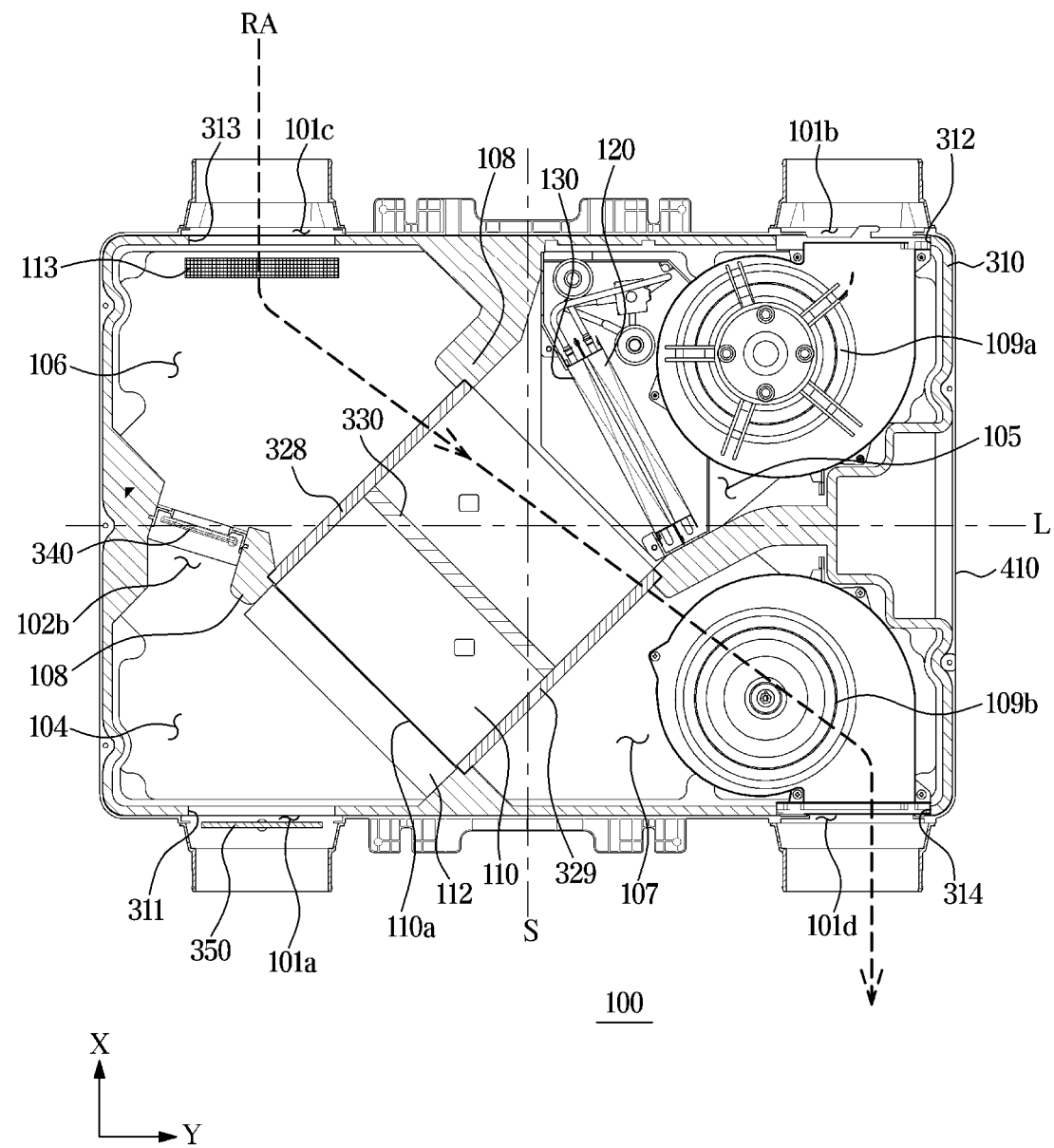
FIG. 13 shows a flow of air through a first flow path inside a ventilation apparatus according to an embodiment of the disclosure during a second drying operation of the ventilation apparatus.
Figure 14:
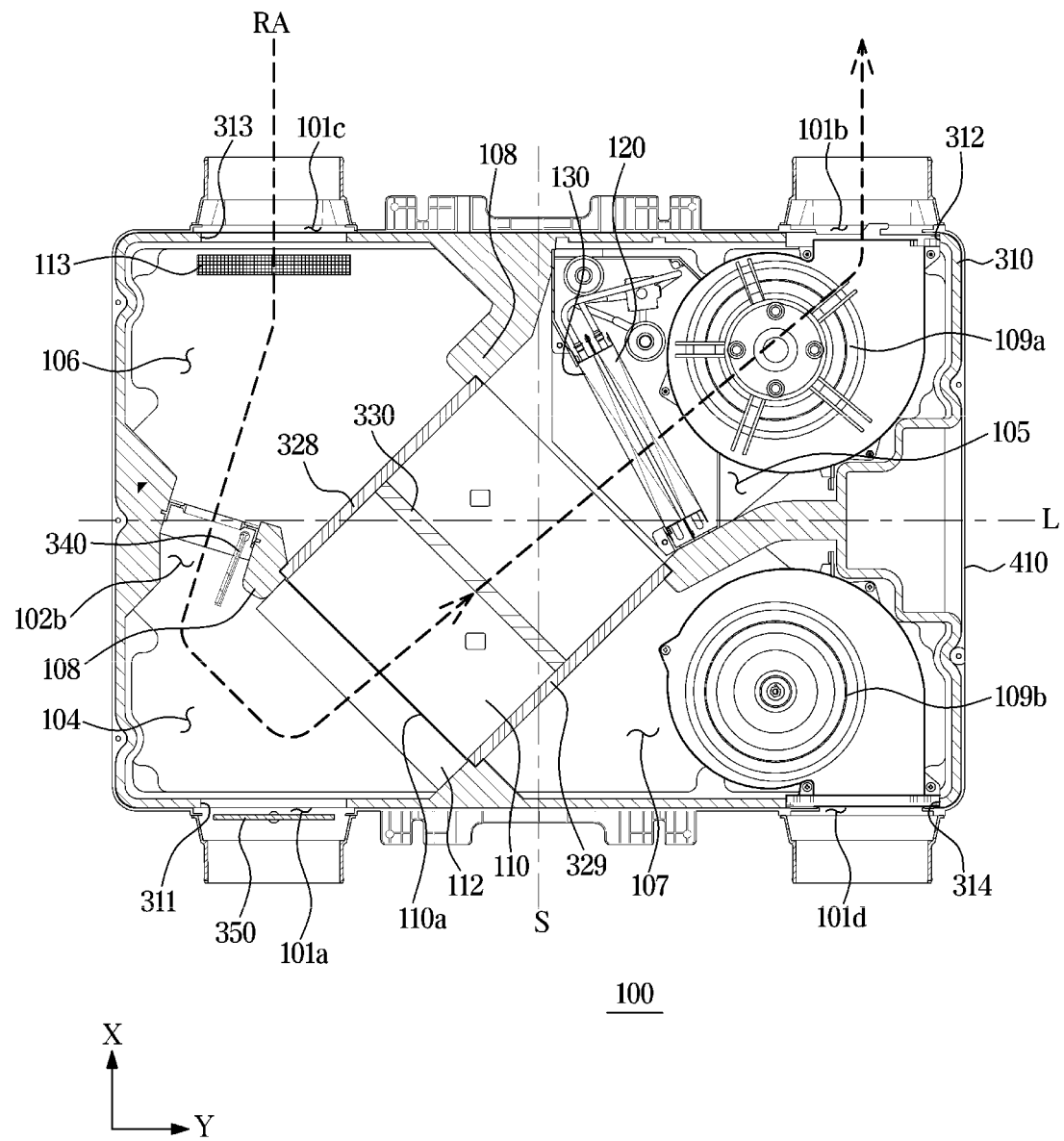
FIG. 14 shows a flow of air through a second flow path inside a ventilation apparatus according to an embodiment of the disclosure during a second drying operation of the ventilation apparatus.

FIG. 13 shows a flow of air through a first flow path inside a ventilation apparatus according to an embodiment of the disclosure during a second drying operation of the ventilation apparatus. FIG. 14 shows a flow of air through a second flow path inside a ventilation apparatus according to an embodiment of the disclosure during a second drying operation of the ventilation apparatus.

As described above, the ventilation apparatus 100 may perform a second drying operation for the total heat exchanger 110, according to an identification that a difference value between first temperature of outside air and second temperature of room air is greater than a preset threshold value (for example, 5° C.). During the second drying operation, the second blower 109b and the first blower 109a may operate alternately. Also, during the second drying operation, the first damper 330 and the third damper 350 may be closed, and the second damper 340 may be closed and open alternately. Because a great temperature difference between outside air OA and room air RA may cause condensation of the total heat exchanger 110, a drying operation for drying the total heat exchanger 110 may be required to remove condensation.

Referring to FIG. 13, for a first time of the second drying operation for drying the total heat exchanger 110, the first damper 330, the second damper 340, and the third damper 350 may be closed, and the second blower 109b may operate (third drying operation). Also, the first blower 109a may stop. Accordingly, room air RA sucked through the second inlet 101c may pass through the total heat exchanger 110, and be discharged to the outside through the second outlet 101d. In contrast, outside air OA may no longer enter through the first inlet 101a. In other words, the total heat exchanger 110 may be dried through the first flow path through which room air flows to the outside of the ventilation apparatus 100.

Referring to FIG. 14, for a second time of the second drying operation, the first damper 330 and the third damper 350 may be closed, the second damper 340 may open, and the first blower 10a may operate (fourth drying operation). Also, the second blower 109b may stop. Accordingly, room air RA entered through the second inlet 101c may pass through the connecting flow path 102b, pass through the filter 112 and the total heat exchanger 110, and then be discharged to an indoor space through the first outlet 101b. That is, during the second drying operation, outside air may no longer enter through the first inlet 101a.

Also, during the second drying operation for the total heat exchanger 110, the processor 192 of the ventilation apparatus 100 may operate the compressor 200 to supply a refrigerant to the heat exchangers 120 and 130, and control the first expander 160 and the second expander 170. Accordingly, air dehumidified by the heat exchangers 120 and 130 may be discharged to the indoor space through the first outlet 101b.

Figure 15:
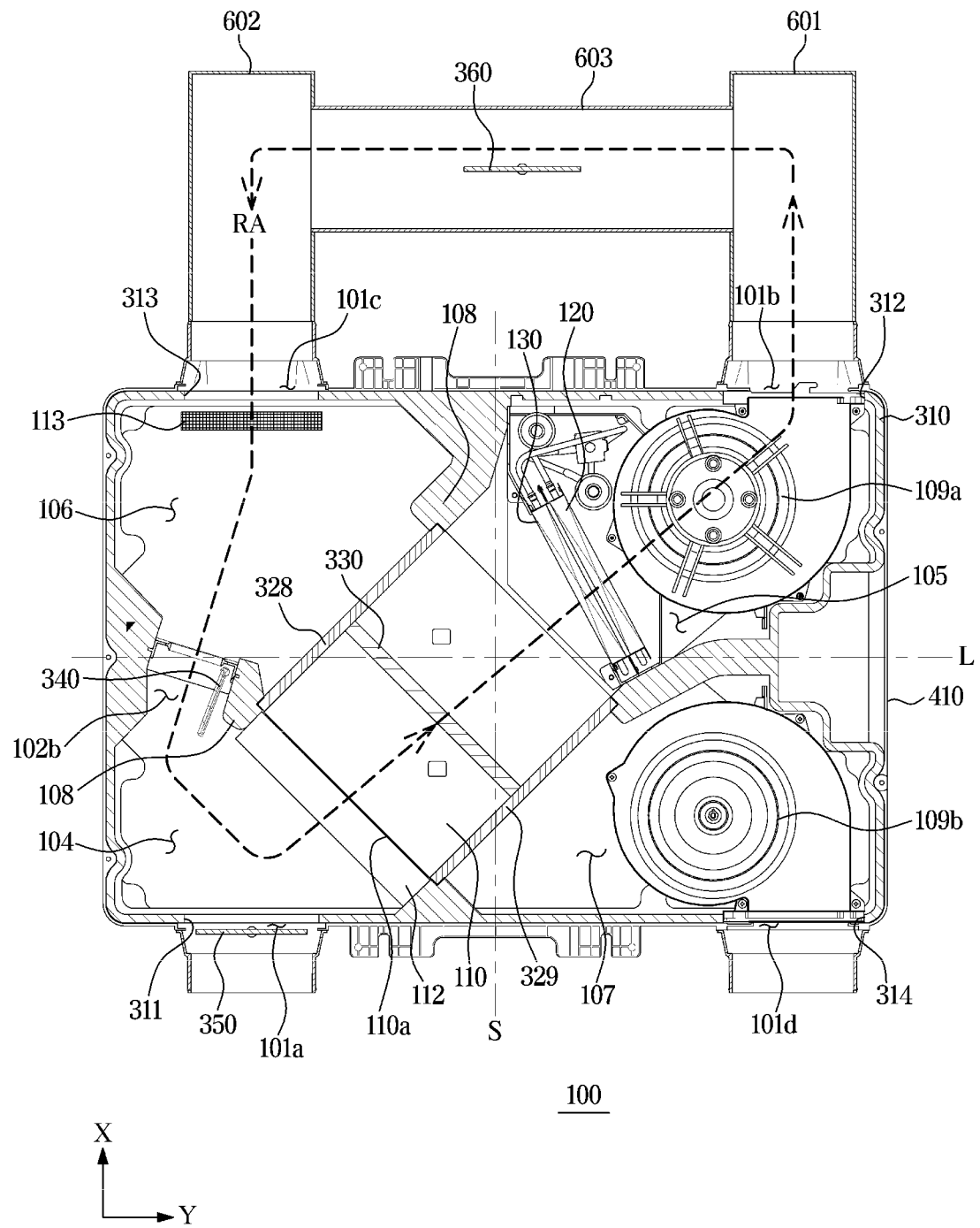
FIG. 15 shows an embodiment of the disclosure, which is additionally applicable to the second drying operation described in FIG. 14.

FIG. 15 shows an embodiment of the disclosure, which is additionally applicable to the second drying operation described in FIG. 14.

Referring to FIG. 15, the ventilation apparatus 100 may include the first duct 601 communicating with the first outlet 101b and provided outside the housing 101, the second duct 602 communicating with the second inlet 101c and provided outside the housing 101, and the third duct 603 connecting the first duct 601 with the second duct 602 and forming a return flow path between the first outlet 101b and the second inlet 101c. The ventilation apparatus 100 may include the fourth damper 360 provided inside the third duct 603 to open and close the third duct 603.

During a second drying operation, the processor 192 of the ventilation apparatus 100 may open the fourth damper 360 in correspondence to an operation of the first blower 109a, and close the fourth damper 360 in correspondence to a stop of the first blower 109a. In other words, for the second time of the second drying operation, the processor 192 may open the fourth damper 360 to open the return flow path formed by the third duct 603. Air dehumidified by passing through the heat exchangers 120 and 130 may be discharged through the first outlet 101b, and again guided to the second inlet 101c through the third duct 603. The processor 192 may close the fourth damper 360 based on an elapse of the second time and/or a stop of the first blower 109a. Because air dried by the heat exchangers 120 and 130 is again guided to the second inlet 101c, drying efficiency of the total heat exchanger 110 may be improved.

Figure 16:
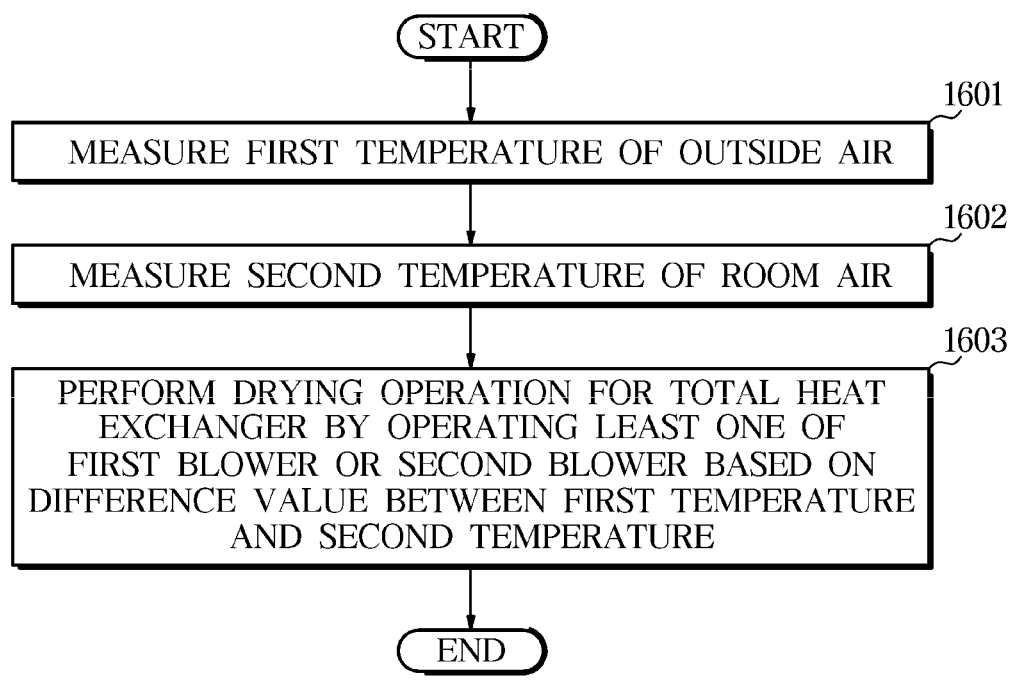
FIG. 16 is a flowchart illustrating a method for controlling a ventilation apparatus, according to an embodiment of the disclosure.

FIG. 16 is a flowchart illustrating a method for controlling a ventilation apparatus, according to an embodiment of the disclosure.

Referring to FIG. 16, the processor 192 of the ventilation apparatus 100 may control the outside temperature sensor 141 to measure first temperature of outside air (1601). The processor 192 may control the room temperature sensor 142 to measure second temperature (room temperature) of room air (1602). The processor 192 may detect or calculate a difference value between the first temperature of the outside air and the second temperature of the room temperature.

The processor 192 may operate at least one of the first blower 109a or the second blower 109b based on the difference value between the first temperature of the outside air and the second temperature of the room air, and perform a drying operation for the total heat exchanger 110 (1603). For example, according to an identification that the difference value between the first temperature of the outside air and the second temperature of the room air is smaller than or equal to a preset threshold value (for example, 5° C.), the processor 192 may perform a first drying operation for the total heat exchanger 110. According to an identification that the difference value between the first temperature of the outside air and the second temperature of the room air is greater than the preset threshold value (for example, 5° C.), the processor 192 may perform a second drying operation for the total heat exchanger 110.

FIG. 17 is a flowchart detailedly illustrating the method for controlling the ventilation apparatus, described in FIG. 16.

Referring to FIG. 17, the processor 192 of the ventilation apparatus 100 may control the outside temperature sensor 141 to measure first temperature of outside air (1701). The processor 192 may control the room temperature sensor 142 to measure second temperature (room temperature) of room air (1702). The processor 192 may detect or calculate a difference value between the first temperature of the outside air and the second temperature of the room air (1703).

The processor 192 may compare the difference value between the first temperature of the outside air and the second temperature of the room temperature with a preset threshold value (1704). According to an identification that the difference value between the first temperature of the outside air and the second temperature of the room temperature is smaller than or equal to the preset threshold value (for example, 5° C.), the processor 192 may set execution of a first drying operation. For the first drying operation, the processor 192 may open the first damper 330 provided on the bypass flow path 331 bypassing the total heat exchanger 110, close the second damper 340 provided on the connecting flow path 102b between the first inlet 101a and the second inlet 101c, and open the third damper 350 provided in the first inlet 101a (1705). At the same time, the processor 192 may perform the first drying operation by operating the first blower 109a and the second blower 109b (1706).

The first drying operation may be performed for a preset drying time (for example, 20 minutes). According to an elapse of the drying time after the first drying operation starts, the processor 192 may identify that the total heat exchanger 110 has been completely dried, and finish the drying operation for the total heat exchanger 110 (1707).

According to an identification that the difference value between the first temperature of the outside air and the second temperature of the room temperature is greater than the preset threshold value (for example, 5° C.), the processor 192 of the ventilation apparatus 100 may set execution of a second drying operation, and close the first damper 330 and the third damper 350 (1708). The processor 192 may close the second damper 340 and operate the second blower 109b for a first time (1709). For a second time after the first time elapses, the processor 192 may open the second damper 340 and operate the first blower 109a (1710).

The second drying operation may be performed for a preset drying time (for example, 20 minutes). According to an elapse of the drying time after the second drying operation starts, the processor 192 may identify that the total heat exchanger 110 has been completely dried, and finish the drying operation for the total heat exchanger 110 (1707).

As described above, the ventilation apparatus and the control method thereof may prevent a mold from being formed in the total heat exchanger by performing a drying operation for the total heat exchanger. Accordingly, a life cycle of the total heat exchanger may increase, and quality of air that is supplied to a room space may also be improved.

The ventilation apparatus and the control method thereof may easily manage the total heat exchanger according to a user's selection or a preset schedule.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments.

A machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

The method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., Play Store™) or between two user devices (e.g., smart phones) directly. When distributed online, at least part of the computer program product (e.g., a downloadable app) may be temporarily generated or at least temporarily stored in the machine-readable storage medium, such as a memory of the manufacturer's server, a server of the application store, or a relay server.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the disclosure. Thus, it should be understood that the disclosed embodiments described above are merely for illustrative purposes and not for limitation purposes in all aspects.

What is claimed is:

1. A ventilation apparatus comprising:
   a housing including
      a first inlet through which outside air is suctioned into the housing,
      a second inlet through which room air is suctioned into the housing,
      a first outlet through which the outside air is discharged to an indoor space, and
      a second outlet through which the room air is discharged to an outdoor space;
   an outside temperature sensor configured to measure a first temperature of the outside air;
   a room temperature sensor configured to measure a second temperature of the room air;
   a total heat exchanger to perform heat exchange between the outside air and the room air;
   a first blower connectable with the first outlet;
   a second blower connectable with the second outlet; and
   a processor configured to
      perform a drying operation to dry the total heat exchanger by operating at least one of the first blower while the first blower is connected to the first outlet and the second blower while the second blower is connected to the second outlet, whereby based on a difference value between the first temperature and the second temperature, the drying operation is adjusted by selecting from the operating of the at least one of the first blower and the second blower and operating of both the first blower and the second blower.

2. The ventilation apparatus of claim 1, wherein the processor is configured to:
   perform a first drying operation of operating both the first blower and the second blower, based on the difference value between the first temperature and the second temperature being smaller than or equal to a preset threshold value; and
   perform a second drying operation of alternately operating the first blower and the second blower, based on the difference value between the first temperature and the second temperature being greater than the preset threshold value.

3. The ventilation apparatus of claim 2, further comprising:
   a first damper formed between the first inlet and the first outlet, and the first damper to open or close a bypass flow path bypassing the total heat exchanger;
   a second damper to open or close a connecting flow path formed between the first inlet and the second inlet; and
   a third damper to open or close the first inlet,
   wherein the processor is further configured to control the first damper, the second damper, and the third damper based on the first drying operation or the second drying operation.

4. The ventilation apparatus of claim 3, wherein the processor is configured to open the first damper and the third damper and close the second damper during the first drying operation.

5. The ventilation apparatus of claim 3, wherein the processor is further configured to close, during the second drying operation, the first damper and the third damper, and alternately close and open the second damper in correspondence to an alternate operation of the second blower and the first blower.

6. The ventilation apparatus of claim 5, wherein the processor is configured to close the second damper and operate the second blower for a first predetermined time, and open the second damper and operate the first blower for a second predetermined time after the first predetermined time elapses.

7. The ventilation apparatus of claim 6, wherein the processor is configured to set the first predetermined time to a longer time than the second predetermined time.

8. The ventilation apparatus of claim 3, further comprising:
   a first duct connectable with the first outlet and provided outside the housing;

a second duct connectable with the second inlet and provided outside the housing;

a third duct connecting the first duct with the second duct, and forming a return flow path between the first outlet and the second inlet; and a fourth damper provided inside the third duct and opening or closing the return flow path.

9. The ventilation apparatus of claim 8, wherein the processor is further configured to open, during the second drying operation, the fourth damper in correspondence to an operation of the first blower and close the fourth damper in correspondence to a stop of the first blower.

10. The ventilation apparatus of claim 8, further comprising a heat exchanger provided between the total heat exchanger and the first blower and configured to dehumidify air passed through the total heat exchanger.

11. The ventilation apparatus of claim 1, wherein the processor is configured to perform the drying operation to dry the total heat exchanger based on a preset schedule.

12. The ventilation apparatus of claim 1, further comprising an inputter configured to obtain a user input, wherein the processor is configured to perform the drying operation to dry the total heat exchanger based on the user input including a drying command for the total heat exchanger.

13. A method for controlling a ventilation apparatus, the method comprising:

measuring a first temperature of outside air which is suctioned into a housing of the ventilation apparatus through a first inlet;

measuring a second temperature of room air which is suctioned into the housing of the ventilation apparatus through a second inlet;

detecting a difference value between the first temperature of the outside air discharged into an indoor space through a first outlet and the second temperature of the room air discharged to an outdoor space through a second outlet; and performing a drying operation for a total heat exchanger, which performs heat exchange between the outside air and the room air, by operating at least one of a first blower while the first blower is connected with the first outlet and a second blower while the second blower connected with the second outlet, whereby based on the difference value between the first temperature and the second temperature, the drying operation is adjusted by selecting from the operating of the at least one of the first blower and the second blower and operating of both the first blower and the second blower.

14. The method of claim 13, wherein the performing of the drying operation for the total heat exchanger comprises:

performing a first drying operation of operating both the first blower and the second blower, based on the difference value between the first temperature and the second temperature being smaller than or equal to a preset threshold value; and performing a second drying operation of alternately operating the first blower and the second blower, based on the difference value between the first temperature and the second temperature being greater than the preset threshold value.

15. The method of claim 14, wherein the performing of the first drying operation comprises:

opening a first damper provided in a bypass flow path bypassing the total heat exchanger;

closing a second damper provided in a connecting flow path between the first inlet and the second inlet; and opening a third damper provided in the first inlet.

* * * * *